(12) United States Patent
Choi et al.

(10) Patent No.: US 9,253,699 B2
(45) Date of Patent: Feb. 2, 2016

(54) METHOD AND APPARATUS FOR CONTROLLING AND SUPPORTING A DYNAMIC CELL ON/OFF IN WIRELESS ACCESS SYSTEM

(71) Applicant: LG ELECTRONICS INC., Seoul (KR)

(72) Inventors: Hyeyoung Choi, Seoul (KR); Jaehoon Chung, Seoul (KR); Eunjong Lee, Seoul (KR); Heejeong Cho, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/167,842

(22) Filed: Jan. 29, 2014

(65) Prior Publication Data

US 2014/0211763 A1    Jul. 31, 2014

Related U.S. Application Data

(60) Provisional application No. 61/757,715, filed on Jan. 29, 2013.

(51) Int. Cl.
*H04W 36/20*    (2009.01)
*H04W 36/00*    (2009.01)
*H04W 24/02*    (2009.01)

(52) U.S. Cl.
CPC .......... *H04W 36/20* (2013.01); *H04W 36/0083* (2013.01); *H04W 24/02* (2013.01); *Y02B 60/50* (2013.01)

(58) Field of Classification Search
CPC ..... H04W 92/02; H04W 52/18; H04W 52/02; H04W 36/30; H04W 36/24; H04W 36/22; H04W 36/20; H04W 36/04; H04W 36/00; H04W 24/00; H04W 36/083; H04W 36/32; G08C 17/02; G01R 19/165
USPC ......... 370/252, 311, 331, 332, 425–437, 500, 370/522, 525; 324/433; 455/425–437, 500, 455/522, 525
See application file for complete search history.

(56) References Cited

U.S. PATENT DOCUMENTS

| 2011/0237257 | A1* | 9/2011 | Soliman et al. ............... 455/436 |
| 2013/0194989 | A1* | 8/2013 | Centonza et al. ............. 370/311 |
| 2013/0203452 | A1* | 8/2013 | Awoniyi et al. ............... 455/500 |
| 2015/0031369 | A1* | 1/2015 | Gunnarsson et al. ......... 455/438 |

FOREIGN PATENT DOCUMENTS

| WO | WO 2012148442 A1 * | 11/2012 |
| WO | WO 2013177774 A1 * | 12/2013 |
| WO | WO 2014116154 A1 * | 7/2014 |

* cited by examiner

*Primary Examiner* — Jamal Javaid
*Assistant Examiner* — Wali Butt
(74) *Attorney, Agent, or Firm* — Lee, Hong, Degerman, Kang & Waimey

(57) ABSTRACT

The present invention relates to a wireless access system and provides methods and apparatuses for controlling and supporting dynamic cell on or off. In an embodiment of the present invention, a method for supporting on or off of a second cell at a first cell in a wireless access system includes receiving a cell on/off state indicator message indicating on or off of the second cell from the second cell, adjusting a handover offset of the second cell, taking into account interference caused by the on or off of the second cell, and transmitting handover offset information about the adjusted handover offset to at least one of the second cell and a first User Equipment (UE).

8 Claims, 14 Drawing Sheets

FIG. 3
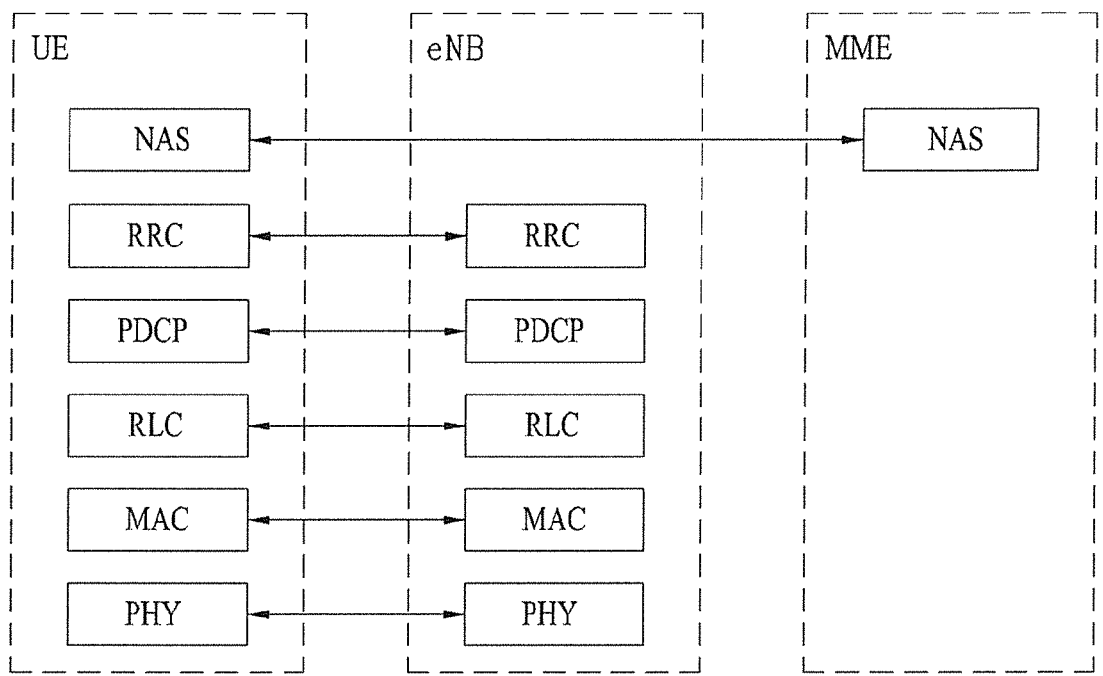
(a) Control - plane protocol stack
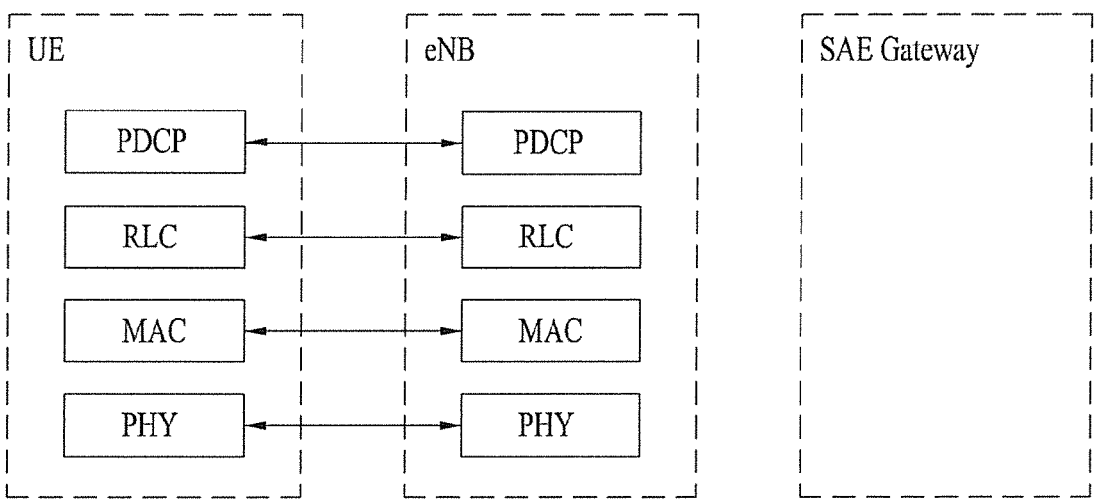
(b) User - plane protocol stack MeNB : macro eNodeB  MUE : macro UE
PeNB : pico eNodeB  PUE : pico UE
FeNB : femto eNodeB  FUE : femto UE

METHOD AND APPARATUS FOR CONTROLLING AND SUPPORTING A DYNAMIC CELL ON/OFF IN WIRELESS ACCESS SYSTEM

TECHNICAL FIELD

The present invention relates to a wireless access system, and more particularly, to methods and apparatus for controlling and supporting a dynamic cell on-off.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

An object of the present invention devised to solve the problem lies on a method for efficiently managing the power of a serving cell.

Another object of the present invention devised to solve the problem lies on a method for, when a cell is dynamically turned on or off, controlling interference with a neighbor cell in a small-cell environment.

The objects achieved by the present invention are not limited to the above-described objects and those skilled in the art may consider other objects from the following description of the embodiments of the present invention.

Technical Solution

The present invention provides methods and apparatus for controlling and supporting a dynamic cell on-off.

The object of the present invention can be achieved by providing a method for supporting on or off of a second cell at a first cell in a wireless access system, including receiving a cell on/off state indicator message indicating on or off of the second cell from the second cell, adjusting a handover offset of the second cell, taking into account interference caused by the on or off of the second cell, and transmitting handover offset information about the adjusted handover offset to at least one of the second cell and a first User Equipment (UE).

The method may further include, if the cell on/off state indicator message indicates on of the second cell, receiving a measurement report message including measurement result information measured based on the handover offset information from the first UE, and determining whether to perform handover of the first UE to the second cell based on the measurement result information.

The method may further include, if the cell on/off state indicator message indicates off of the second cell, transmitting a message including the handover offset information to a second first UE within the coverage of the second cell by the second cell, receiving a measurement report message including measurement result information measured based on the handover offset information from the second UE by the second cell, and determining whether to perform handover of the second UE to the first cell based on the measurement result information by the second cell.

In this case, the method may further include controlling transmission power based on the handover offset information, when the second cell is off, and transmitting the controlled transmission power value to the second UE.

In another aspect of the present invention, a method for controlling transmission power upon cell on/off in a wireless access system includes powering on with initial transmission power by a second cell, adjusting a handover offset to reduce interference with a first cell neighboring to the second cell by the second cell, transmitting power information indicating the initial transmission power and handover offset information about the adjusted handover offset to at least one of the first cell and a UE by the second cell, performing handover with the UE receiving the handover offset information by the second cell, and transmitting to the UE a power level indicator message indicating an on transmission power controlled from the initial transmission power based on the handover offset by the second cell.

The second cell may determine the initial transmission power, taking into account interference with the first cell.

The handover offset information may be handover offset information about the second cell.

The handover offset information may be handover offset information about the first cell.

The UE may perform neighbor cell measurement to perform handover from the first cell to the second cell based on the handover offset information.

In another aspect of the present invention, an apparatus for supporting on or off of a second cell in a wireless access system includes a transmitter, a receiver, and a processor configured to support the on/off of the second cell.

The processor controls the receiver to receive a cell on/off state indicator message indicating on or off of the second cell from the second cell, adjusts a handover offset of the second cell, taking into account interference caused by the on or off of the second cell, and controls the transmitter to transmit handover offset information about the adjusted handover offset to at least one of the second cell and a first UE.

If the cell on/off state indicator message indicates on of the second cell, the processor may control the receiver to receive a measurement report message including measurement result information measured based on the handover offset information from the first UE, and may determine whether to perform handover of the first UE to the second cell based on the measurement result information.

Or if the cell on/off state indicator message indicates off of the second cell, the second cell may transmit a message including the handover offset information to a second first UE within the coverage of the second cell, may receive a measurement report message including measurement result information measured based on the handover offset information from the second UE, and may determine whether to perform handover of the second UE to a first cell based on the measurement result information.

When the second cell is off, the second cell may control transmission power based on the handover offset information and may transmit the controlled transmission power value to the second UE.

Advantageous Effects

According to the embodiments of the present invention, the following effects are obtained.

First of all, power can be managed efficiently in a network where a plurality of cells are deployed.

In addition, interference between adjacent Base Stations (BSs) caused by dynamic turn-on or turn-off of a cell can be controlled effectively.

The effects of the present invention are not limited to the above-described effects and other effects which are not described herein will be understood by those skilled in the art from the following description of the embodiments of the present invention. That is, unintended effects of the present invention may be also derived by those skilled in the art from the embodiments of the present invention.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 illustrates the configurations of a radio interface protocol between the E-UTRAN and a UE;

FIG. 13 illustrates a change in the coverage of a second cell according to control of an HO offset, in the case of cell on;

FIG. 16 is a diagram illustrating a signal flow for one of methods for controlling an HO offset of a neighbor cell by the neighbor cell, in the case of cell on;

BEST MODE

Figure 1:
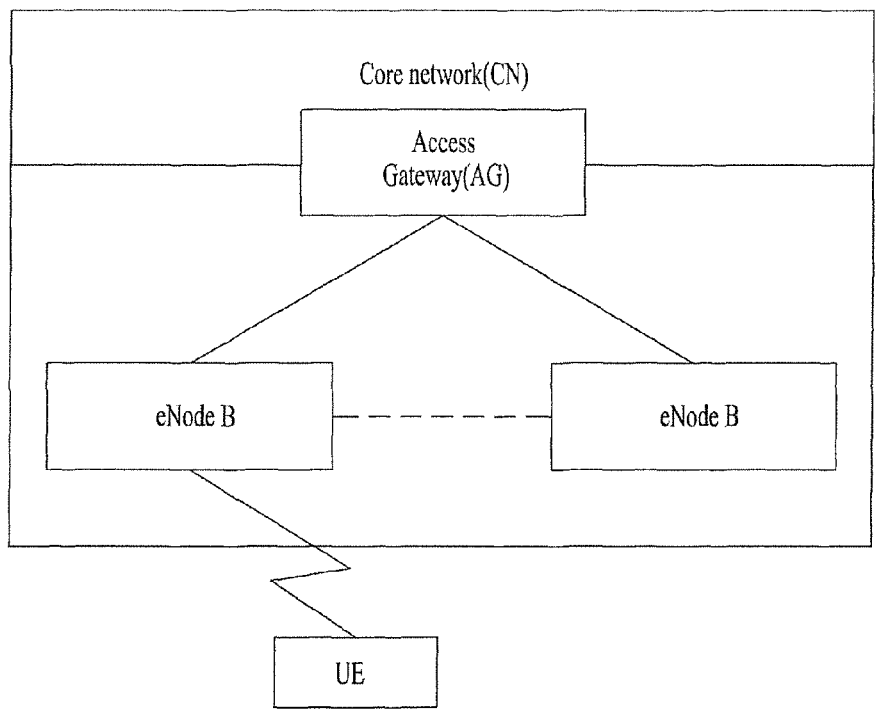
FIG. 1 illustrates a schematic structure a network structure of an evolved universal mobile telecommunication system (E-UMTS).

The present invention provides methods and apparatus for controlling and supporting a dynamic cell on-off.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

In the description of the drawings, procedures or steps which render the scope of the present invention unnecessarily ambiguous will be omitted and procedures or steps which can be understood by those skilled in the art will be omitted.

The embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or network nodes other than the base station. The term "Base Station (BS)" may be replaced with the terms fixed station, Node-B, eNode-B (eNB), advanced base station (ABS), a macro cell, a small cell, or access point as necessary.

The term "terminal" may also be replaced with the term user equipment (UE), mobile station (MS), subscriber station (SS), mobile subscriber station (MSS), mobile terminal or advanced mobile station (AMS) as necessary.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station becomes a transmitter.

The embodiments of the present invention are supported by standard documents disclosed in at least one of the Institute of Electrical and Electronic Engineers (IEEE) 802.xx system, the $3^{rd}$ generation partnership project (3GPP) system, the 3GPP LTE system and the 3GPP2 system, all of which are wireless access systems. In particular, the embodiments of the present invention are supported by the standard documents such as the 3GPP TS 36.211, TS 36.212, TS 36.213, TS 36.321 and/or 3GPP TS 36.331, all of which are the standard documents of the 3GPP LTE system. That is, the steps or the portions of the embodiments of the present invention which are not described in order to clarify the technical spirit are supported by the above-described documents. All the terms disclosed in the present specification may be described by the above-described standard documents.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

The specific terms used in the following description are provided in order to facilitate the understanding of the present invention and may be changed in other forms without departing from the technical scope of the present invention.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with radio technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with radio technology such as Institute of Electrical and Electronics Engineers (IEEE) 802.11 (Wi-Fi), IEEE 802.16 (WiMax), IEEE 802-20, and E-UTRA (Evolved UTRA). The UTRA is a part of the UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. For clarity, the following description focuses on 3GPP LTE and LTE-A. However, the present invention is applicable to an IEEE 802.16e/m system.

1. 3GPP LTE/LTE-A System

Hereinafter, 3GPP LTE (3rd Generation Partnership Project Long Term Evolution; hereinafter called "LTE") system which is one of mobile communication systems is described.

1.1 General LTE System

FIG. 1 illustrates a schematic structure a network structure of an evolved universal mobile telecommunication system (E-UMTS).

An E-UMTS system is an evolved version of the WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service. The AG can be divided into a part that handles processing of user traffic and a part that handles control traffic. Here, the AG part for processing new user traffic and the AG part for processing control traffic can communicate with each other using a new interface. One or more cells may be present for one eNB. An interface for transmitting user traffic or control traffic can be used between eNBs. A Core Network (CN) may include the AG and a network node or the like for user registration of UEs. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 2:
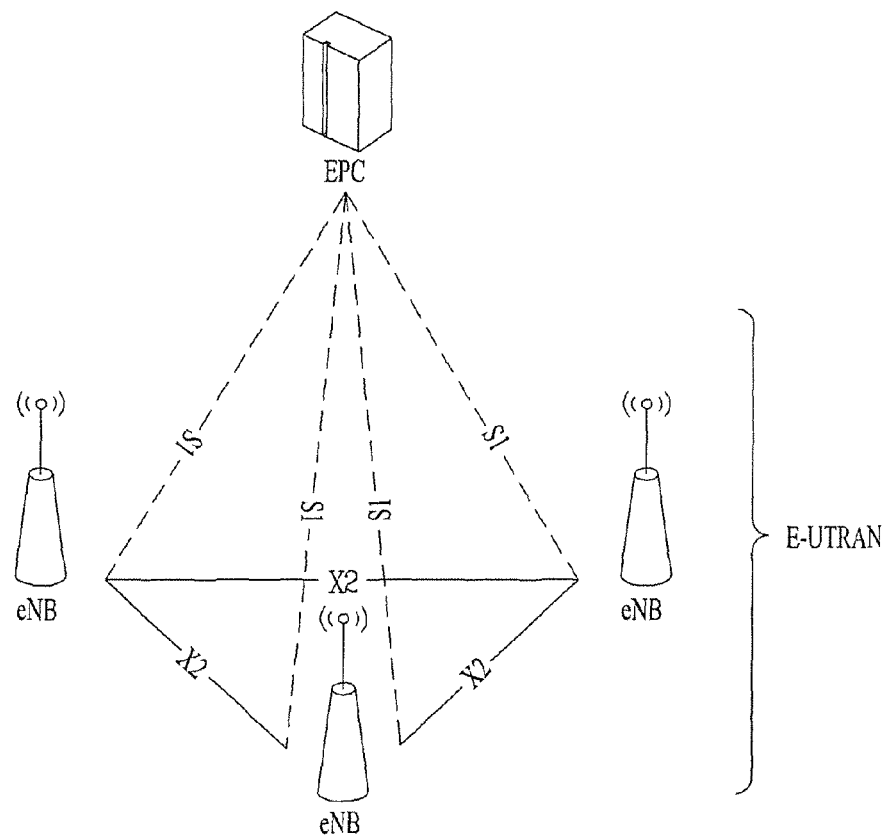
FIG. 2 illustrates a schematic structure of an Evolved Universal Terrestrial Radio Access Network (E-UTRAN).

FIG. 2 illustrates a network structure of an Evolved Universal Terrestrial Radio Access Network (E-UTRAN) system.

The E-UTRAN system is an evolved version of the conventional UTRAN system. The E-UTRAN includes base stations that will also be referred to as "eNode Bs" or "eNBs". The eNBs are connected through X2 interfaces. The X2 user plane interface (X2-U) is defined between eNBs. The X2-U interface provides non guaranteed delivery of user plane PDUs. The X2 control plane interface (X2-CP) is defined between two neighbor eNBs. The X2-CP performs following functions: context transfer between eNBs, control of user plane tunnels between source eNB and target eNB, transfer of handover related messages, uplink load management and the like.

Each eNB is connected to User Equipments (UEs) through a radio interface and is connected to an Evolved Packet Core (EPC) through an S1 interface. The S1 user plane interface (S1-U) is defined between the eNB and the S-GW. The S1-U interface provides non guaranteed delivery of user plane PDUs between the eNB and the S-GW (Serving Gateway). The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like.

FIG. 3 illustrates the configurations of a control plane and a user plane of a radio interface protocol between the E-UTRAN and a UE based on the 3GPP radio access network standard.

The radio interface protocol is divided horizontally into a physical layer, a data link layer, and a network layer, and vertically into a user plane for data transmission and a control plane for signaling. The protocol layers of FIG. 3 can be divided into an L1 layer (first layer), an L2 layer (second layer), and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports reliable data transmission. The functions of the RLC layer may also be implemented through internal functional blocks of the MAC layer. In this case, the RLC layer need not be present. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the E-UTRAN. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

1.2 Heterogeneous Network Deployment

Figure 4:
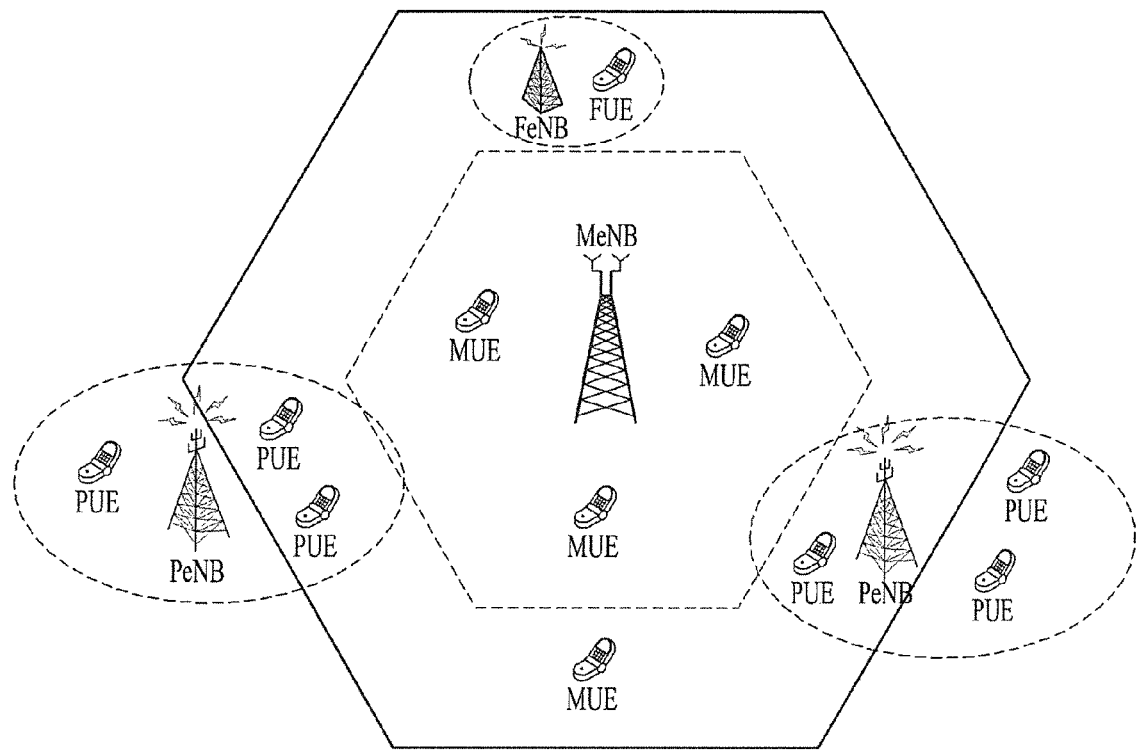
FIG. 4 illustrates an example of heterogeneous network deployment.

FIG. 4 illustrates an example of heterogeneous network deployment.

To stably ensure data service such as multimedia data in a future-generation mobile communication system, more interest has been attracted to the introduction of a hierarchical cell structure or heterogeneous cell structure in which pico cells, femto cells and/or micro cells as a small cell for low-power/short-range communication are co-existent in a macro cell-based homogeneous network.

Adding macro cells to a conventional eNB deployment is inefficient in terms of cost and complexity relative to improved system performance. A heterogeneous network under consideration for a current communication network is configured as illustrated in FIG. 4.

In FIG. 4, an eNode B that manages and covers a macro cell is defined as a Macro eNode B (MeNB) and a UE operating within a macro cell managed by an MeNB is defined as a Macro UE (MUE). Further, an eNode B that manages and covers a pico cell is defined as a Pico eNode B (PeNB) and a UE operating within a pico cell managed by a PeNB is defined as a Pico UE (PUE). An eNode B that manages and covers a femto cell is defined as a Femto eNode B (FeNB) and a UE operating within a femto cell managed by an FeNB is defined as a Femto UE (FUE).

Referring to FIG. 4, a plurality of micro cells may be co-existent in one macro cell. The micro cells are allocated resources by cell coordination and service UEs using the resources. These micro cells are categorized into two types depending on their access schemes.

(1) Open access Subscriber Group (OSG): an OSG-type micro cell is accessible to legacy MUEs or other micro UEs. Handover to the OSG-type micro cell or a macro cell is possible.

(2) Close access Subscriber Group (CSG): a CSG-type micro cell does not allow access from legacy MUEs or other micro UEs without authentication. Therefore, handover to the CSG-type micro cell or a macro cell is impossible.

1.3 Handover Procedure

Figure 5:
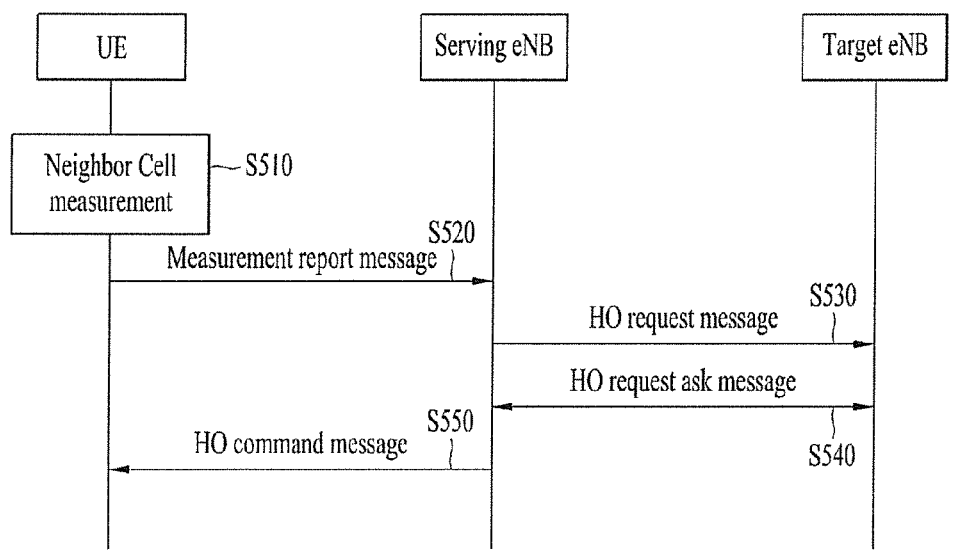
FIG. 5 is a diagram illustrating an exemplary signal flow for handover.

FIG. 5 illustrates an exemplary HandOver (HO) procedure.

Referring to FIG. 5, a UE performs neighbor cell measurement for HO, cell addition, or cell reselection (S510).

That is, upon generation of an HO triggering event while measuring radio channel states of a serving cell and a neighbor cell, the UE transmits a Measurement Report message including the measurements to a serving eNB (S520).

Upon receipt of the Measurement Report message for HO from the UE, the serving eNB transmits an HO Request message to a target cell for HO in order to initiate an HO operation (S530).

The target cell transmits an HO Request Ack message in response to the HO Request message to the serving cell (S540).

Subsequently, the serving cell transmits an HO Command message to the UE and the UE starts a handover operation to a target eNB (S550).

In the neighbor cell measurement step S510, the UE may measure the following three types of measurements.

(1) Reference Signal Received Power (RSRP): an RSRP may be acquired by measuring the magnitude of a cell-specific downlink reference signal. That is, the RSRP is the received power value of a desired signal received from a serving cell.

(2) Received Signal Strength Indicator (RSSI): an RSSI is a total reception power value of a signal received at a UE. The RSSI is a measurement including the interference and reception noise power of neighbor cells as well as the power of a desired signal.

(3) Reference Signal Received Quality (RSRQ):

$$RSRQ = N - \frac{RSRP}{RSSI}$$

where N is the number of Resource Blocks (RBs) in a corresponding bandwidth, when the RSSI is measured.

In step S520, the UE reports the measurements to the serving cell by the Measurement Report message according to the following event-triggered measurement reporting criteria.

(1) Event A1: Serving cell becomes better than absolute threshold.

(2) Event A2: Serving cell becomes worse than absolute threshold.

(3) Event A3: Neighbor cell becomes better than an offset relative to the serving cell.

(4) Event A4: Neighbor cell becomes better than absolute threshold.

(5) Event A5: Serving cell becomes worse than one absolute threshold and neighbor cell becomes better than another absolute threshold.

Figure 6:
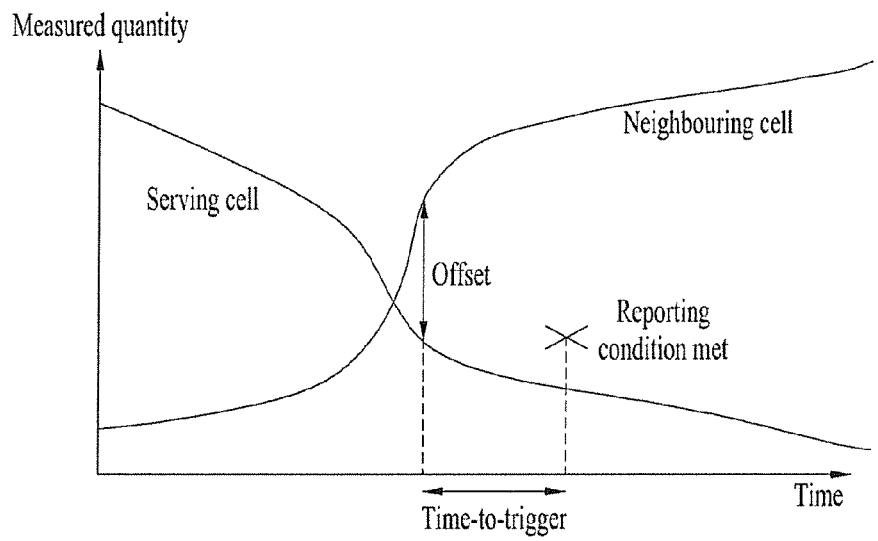
FIG. 6 illustrates an exemplary event-triggered reporting condition based on Event A3.

FIG. 6 illustrates an exemplary event-triggered reporting condition based on Event A3.

In FIG. 6, the vertical axis represents measurements and the horizontal axis represents time units. Referring to FIG. 6, the measurement quality of a signal received from a serving cell becomes degraded over time, while the measurement quality of a signal received from a neighbor cell becomes better. In the case where the RSRP of the serving cell is larger than the RSRP of the neighbor cell by a specific offset or more, if the condition is kept satisfied until after a predetermined time, time-to-trigger elapses, the UE transmits the Measurement Report message to the serving cell.

For details of measurement reporting triggers and measurement reporting in step S520 of FIG. 5, refer to Clauses 5.5.4 and 5.5.5 of 3GPP TS 36.331 v11.2.0. Among the above measurement report-triggering events, Event A3 will be described in greater detail.

In Event A3, the UE should consider an entering condition for this event to be satisfied when condition A3-1, as specified below, is fulfilled. In addition, the UE should consider an ending condition for this event to be satisfied when condition A3-2, as specified below, is fulfilled.

$$Mn+Ofn+Ocn-Hys>Ms+Ofs+Ocs+Off \quad \text{[Equation 1]}$$

$$Mn+Ofn+Ocn+Hys<Ms+Ofs+Ocs+Off \quad \text{[Equation 2]}$$

The variables described in [Equation 1] and [Equation 2] are defined as follows.

"Mn" is the measurement result of the neighboring cell, not taking into account any offsets. "Ofn" is the frequency specific offset of the frequency of the neighbor cell (i.e. offsetFreq as defined within measObjectEUTRA corresponding to the frequency of the neighbor cell). "Ocn" is the cell specific offset of the neighbor cell (i.e. cellIndividualOffset as defined within measObjectEUTRA corresponding to the frequency of the neighbor cell), and set to zero if not configured for the neighbor cell. "Ms" is the measurement result of the serving cell, not taking into account any offsets. "Ofs" is the frequency specific offset of the serving frequency (i.e. offsetFreq as defined within measObjectEUTRA corresponding to the serving frequency). "Ocs" is the cell specific offset of the serving cell (i.e. cellIndividualOffset as defined within measObjectEUTRA corresponding to the serving frequency), and is set to zero if not configured for the serving cell. "Hys" is the hysteresis parameter for this event (i.e. hysteresis as defined within reportConfigEUTRA for this event). "Off" is the offset parameter for this event (i.e. a3-Offset as defined within reportConfigEUTRA for this event). "Mn", "Ms" are expressed in dBm in case of RSRP, or in dB in case of RSRQ. Variations of Ofn, Ocn, Ofs, Ocs, Hys, and Off are expressed in dB.

Offset values used to measure the RSRPs of one or more micro cells (e.g., pico cells or femto cells) are transmitted by higher-layer signaling (e.g., IE MeasObjectEUTRA).

When a UE moves from the cell area of a specific eNB to the cell area of another eNB, the UE performs the above-described handover procedure. Besides this case, the UE may perform handover in the event of power-on or power-off of a cell managed by a specific eNB in embodiments of the present invention. That is, even though the UE does not move, if a cell area is expanded or shrunk, the serving eNB may be changed and then the UE may perform the handover procedure.

1.4 Cell Range Extension (CRE)

CRE is a technology of handing over an MUE that is connected to an MeNB, near to a PeNB and thus experiences severe interference from the PeNB to the PeNB. CRE mitigates the effect of existing interference and contributes to load balancing between cells within a system in a wireless access system.

If a serving cell is determined simply by comparing RSRPs as is conventionally done, the RSRP of an MeNB having high transmission power may be higher than the RSRP of a PeNB having low transmission power in the system structure illustrated in FIG. 4. In this case, an MUE may not perform handover to the PeNB. Accordingly, it is preferable to implement CRE based on a new criterion described in [Equation 3], for reliable CRE in a cell area where an MeNB is co-existent with a PeNB.

$$\text{Pico RSRP+offset>Macro RSRP} \quad \text{[Equation 3]}$$

In [Equation 3], offset is a value set for a UE by higher-layer signaling. With the offset, the UE may perform CRE to a PeNB having low transmission power.

Figure 7:
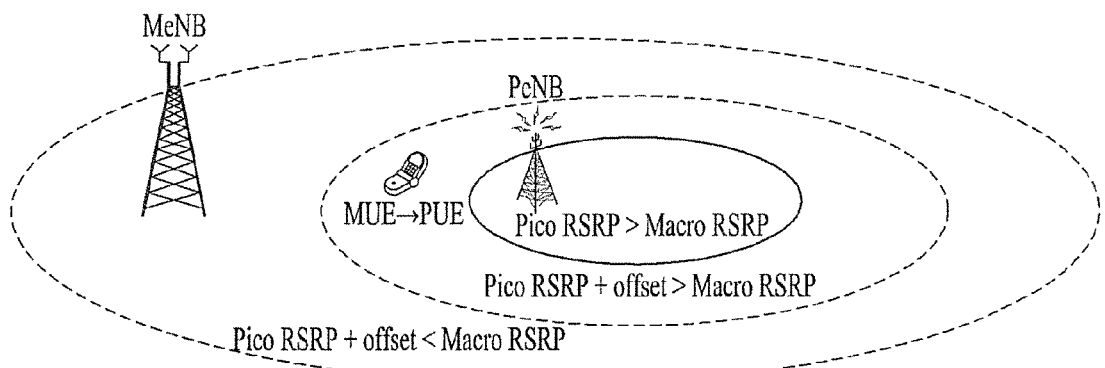
FIG. 7 illustrates an example of Cell Range Extension (CRE)

FIG. 7 illustrates an example of CRE.

Referring to FIG. 7, an MeNB and a PeNB are deployed in a system. The outermost dotted line represents the cell area of the MeNB and the innermost solid line represents the cell area of the PeNB. The middle dotted line represents an area where an MUE may perform HO (or CRE) from the cell area of the MeNB to the cell area of the PeNB.

Therefore, if the sum of the RSRP of the PeNB (pico RSRP) and an offset is smaller than the RSRP of the MeNB (macro RSRP), the MUE continues to receive a service from the MeNB. On the other hand, if the sum of the pico RSRP and the offset is larger than the macro RSRP, the MUE performs handover from the MeNB to the PeNB. Thus the MUE is changed to a PUE.

1.5 Almost Blank Subframe (ABS)

ABS refers to a technology of configuring a time period or a subframe pattern during which data or a control signal is not transmitted in a specific subframe, for the purpose of interference coordination in a heterogeneous network structure. For example, a time period with no transmission of data and/or a control signal may be set for a specific cell by scheduling UEs through information sharing between eNBs. Thus, interference with other cells may be mitigated during the time period.

Figure 8:
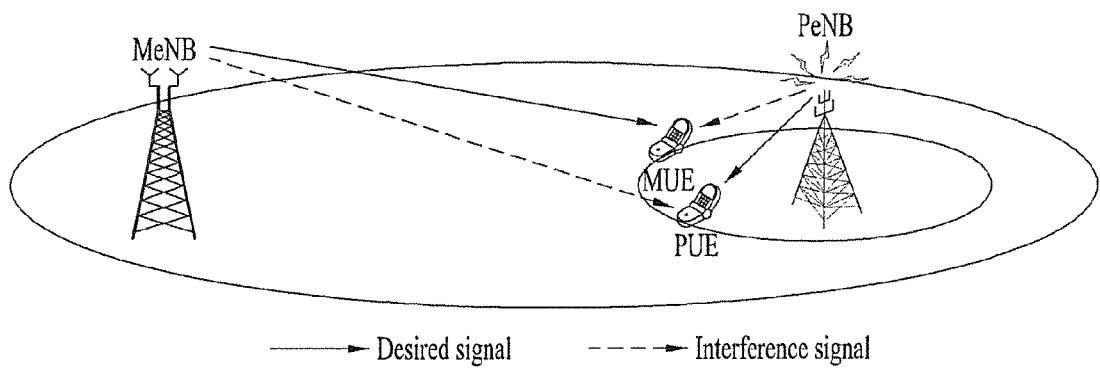
FIG. 8 illustrates an example of transmitting desired signals and interference signals to User Equipments (UEs) located between a Macro evolved Node B (MeNB) and a Pico evolved Node B (PeNB)

FIG. 8 illustrates an example of transmitting desired signals and interference signals to UEs located between an MeNB and a PeNB.

Referring to FIG. 8, an MUE receives a service from an MeNB and a PUE receives a service from a PeNB. It is assumed that the MUE and the PUE are located near to the cell areas of the MeNB and the PeNB. In this case, a signal that the MeNB transmits to the MUE is a desired signal (marked with a solid line) to the MUE but an interference signal (marked with a dotted line) to the PUE. Likewise, a signal that the PeNB transmits to the PUE is a desired signal to the PUE but an interference signal to the MUE.

Even though the MUE performs HO to the PeNB by CRE, the MUE still receives a signal from the MeNB while the MUE is located at a cell edge of the PeNB and the signal acts as interference with the MUE.

Consequently, the best way to prevent the MeNB from interfering radio resources used by the UE at the cell edge of the PeNB is to empty a corresponding subframe.

Figure 9:
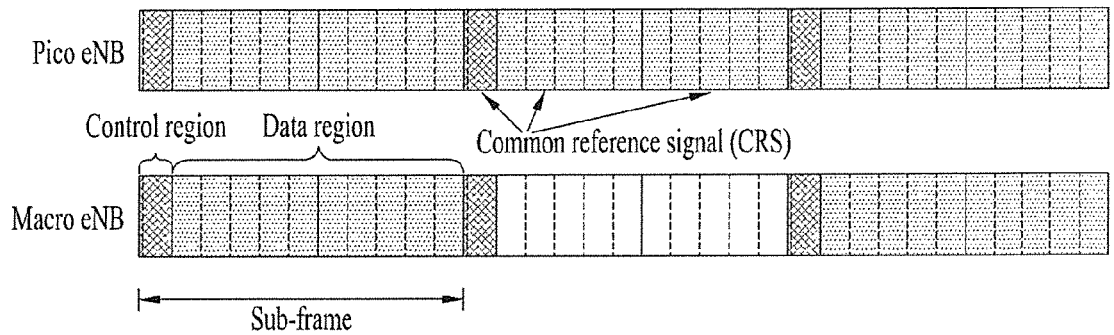
FIG. 9 illustrates an exemplary subframe configured as an Almost Blank Subframe (ABS)
Figure 10:
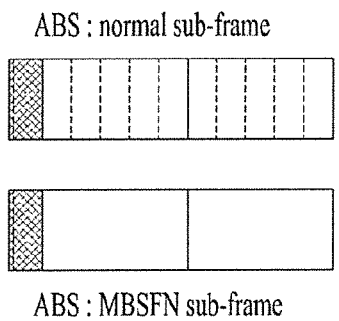
FIG. 10 illustrates ABS types.

FIG. 9 illustrates an exemplary subframe configured as an ABS and FIG. 10 illustrates ABS types.

Referring to FIG. 9, an MeNB may configure a non-data transmission interval and share information about the non-data transmission interval with a PeNB. Thus, the PeNB schedules its edge UEs in a subframe corresponding to the non-data transmission interval, thereby avoiding interference with the UEs caused by the MeNB.

There are two types of ABSs applied to FIG. 9. Referring to FIG. 10(*a*), if an ABS is a normal subframe, a Cell Specific Reference Signal (CRS) is still transmitted in the subframe. In this case, interference may still occur to a CRS of the PeNB.

Referring to FIG. 10(*b*), if an ABS is a Multicast/Broadcast over a Single Frequency Network (MBSFN) subframe, either of data and a CRS is not transmitted in the MBSFN subframe. In this case, no interference may occur to the PeNB. However, since the use of an MBSFN subframe is limited, it is preferred that an eNB generates an ABS pattern in consideration of the characteristics of the normal subframe and the MBSFN subframe.

1.6 Energy Saving (ES)

Protecting the environment and combating climate change are challenges that we face today. In the telecom environment, as energy prices increase, there is added incentive for Network Operators to look for means to reduce energy costs.

OAM of mobile networks can contribute to energy saving by allowing the operator to set policies to minimize consumption of energy, while maintaining coverage, capacity and quality of service. The permitted impact on coverage, capacity and quality of service is determined by operator's policy.

When a cell is in energy saving states, it may need neighboring cells to pick up the load. However a cell in Energy Saving state cannot cause coverage holes or create undue load on the surrounding cells. All traffic on that cell is expected to be drained to other overlaid/umbrella cells before any cells moves to Energy Saving state.

A cell in Energy Saving state is not considered a cell outage or a fault condition. No alarms should be raised to the IRP Manager for any condition that is a consequence of a UE moving into Energy Saving state. In addition, the use of the renewable energy sources (e.g. wind, solar energy) should be encouraged in mobile networks.

The following ESM concepts can apply to different RATs, e.g. UMTS and LTE/LTE-A system. Nevertheless some of these ESM concepts may be limited to specific RATs and network elements, and specific solutions may be required for them.

Figure 11:
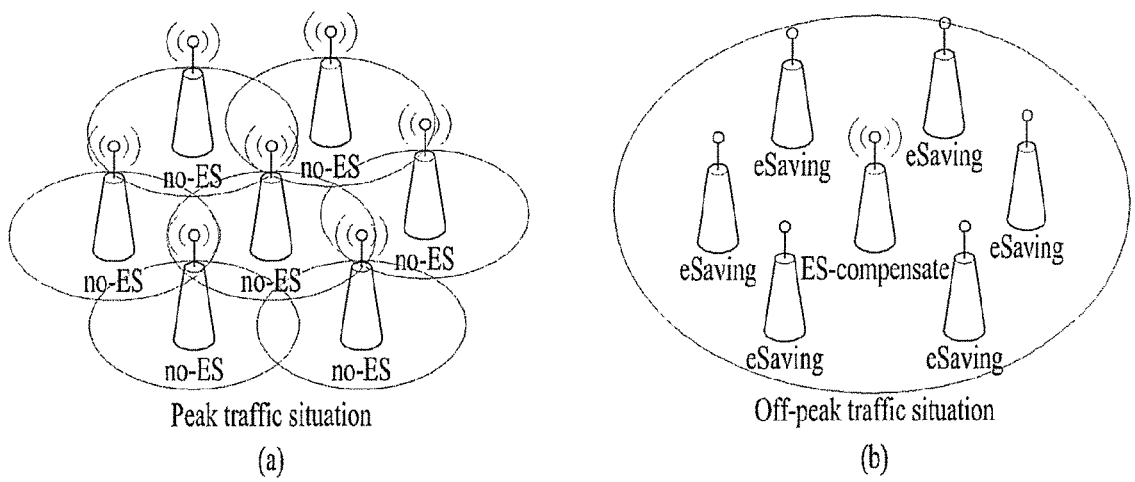
FIG. 11 illustrates network deployment according to a change needed for energy saving.

FIG. 11 illustrates network arrangements corresponding to capacity demand variation for energy saving purposes. Especially, FIG. 11(*a*) shows a pack traffic situation and FIG. 11(*b*) shows an off-peak traffic situation.

Referring to FIG. 11, the coverage area of a cell can be configured dynamically, where an operator would employ smaller coverage areas per cell (to increase capacity per geographic area) in a peak traffic situation. In that case some base stations would be enabled to adjust their transmission power and other configuration parameters for their cells at off-peak times in order to provide coverage for other neighboring cells—which could then be transferred to energy saving state, after handing currently associated UEs over to remaining neighboring cells.

Activating energy saving on certain base stations and modifying radio parameters for increasing coverage for other cells can lead to different neighbor relations as well as different cell and frequency layouts, which should be addressed by automatic neighbor relation, interference control, e.g. through OAM-driven configuration or SON functions, depending on the specific RAT in use. Depending on the specific scenarios, activating energy saving on base stations could ultimately lead to switching off all radio-transmission-related functions at a site, which would lead to reduced energy consumption and could implicitly lead to even further energy saving, e.g. when air condition systems at a site adapt to the reduced cooling requirements—which is not considered here in detail.

The energy saving management in the scenario would ideally lead to situation for an off-peak time as depicted in FIG. 11—where one base station would remain powered one (depicted as ES-Compensate), taking over the coverage areas of neighbor base stations in Energy Saving state (depicted as eSaving).

As another network arrangement, we can consider a eNB overlaid use vase. In order to assure the service connectivity and make no side effect on the service (there is a possible case that a UE may power on in the area of an eNB in ES), only the eNB overlaid by other eNBs (i.e. the area served by the eNB also covered by other eNBs) can enter into ES.

In this scenario, legacy systems (e.g. 2G/3G systems) provide radio coverage together with E-UTRAN. Another case similar with this is that an area covered by different frequencies in E-UTRAN, i.e. inter-frequency case.

According to the definition of base station classes, base stations can be categorized by Macro Cell (Wide Area Base Station), Micro Cell (Medium Range Base Station), Pico Cell (Local Area Base Station) and Femto Cell (characterized by Home Base Station). This category of base station can be applied to enhance the scenarios of inter-frequency eNB overlaid.

2. Dynamic Cell On/Off Procedures

A cell may be powered on/off according to the load of the cell, for the purpose of energy saving or interference coordination/cancelation. For example, network load is different at a specific time in a specific space and signals (e.g. a synchronization signal and an RS) transmitted from a serving cell having no load become interference to a neighbor cell, resulting in unnecessary power consumption. Accordingly, if the serving cell has little load or no load, the serving cell may be powered off for energy saving and interference coordination/cancelation.

Herein, "power-off" of the serving cell may be interpreted as comprehensive power-off of specific functions or network elements of the serving cell and restriction of use of some radio resources. That is, embodiments of the present invention are not limited to the power-off range of a serving cell.

If the serving cell is functionally powered off, the cell may discontinue both DL signal transmission and UL signal reception or may perform only one of DL signal transmission and UL signal reception. In embodiments of the present invention, cell-off may be implemented irrespective of such DL signal transmission and UL signal reception. The term serving cell may mean any of a macro cell and a small cell (e.g., a micro cell, a pico cell, a femto cell, etc.) in embodiments of the present invention.

Power-on/off of a serving cell may significantly affect interference between serving cells and interference may fluctuate greatly according to the frequency of power-on/off of the serving cell. Especially when cells are densely populated or a specific serving cell uses the same frequency as neighbor cells, interference between serving cells may become severe.

For example, if a specific serving cell is powered on, neighbor cells using the same frequency as the specific serving cell may be interfered significantly by the specific serving cell. As the neighbor cells using the same frequency as the specific serving cell are densely populated nearer to the specific serving cell, the power-on of the specific serving cell causes a greater interference to the neighbor cells. If the specific serving cell is powered off, the interference with the neighbor cells using the same frequency as the specific serving cell may be reduced.

When a serving cell is on/off through power control, the serving cell may conserve energy. However, by turning on/off of the serving cell, interferences imposed to other neighbor serving cells may be increased. Therefore, when the power of a serving cell is controlled, the influence on neighbor cells as well as the serving cell should be taken into account. In addition, some UEs may suffer from a Radio Link Failure (RLF) due to power control of the serving cell.

Therefore, embodiments of the present invention propose various methods for controlling the power of a serving cell after performing HO by adjusting an HO offset, when the serving cell is powered on/off.

2.1 Method for Controlling Cell Power in One Step in Case of Cell On

If power-on of a specific serving cell in off state is determined (by the serving cell or a network), the serving cell may be powered on with a specific power value.

For example, the specific power level may be a minimum or maximum transmission power of the serving cell. Or the network (or a neighbor serving cell) may determine the specific power value, in consideration of the influence of the power of the serving cell on neighbor serving cells and may transmit the determined power value to the serving cell via an X2 interface, an SI interface, or an air interface.

Or the serving cell may determine transmission power arbitrarily. The serving cell may indicate the determined transmission power to neighbor serving cells via an X2 interface or an air interface. In addition, the serving cell may indicate the transmission power to UEs connected to the serving cell by an RRC signal or a MAC signal. Upon receipt of the transmission power value, the UEs may use this information in measuring signals received from serving cells.

2.2 Method for Controlling Power in N Steps, in Consideration of HO Offset in Case of Cell On If power-on of a specific serving cell in off state is determined (by the method described in Clause 2.1), the serving cell may be powered on with a specific power value in a first step. Hereinafter, a serving cell for which power-on is determined will be referred to as an on-cell, a second cell, or a second eNB (eNB2) and a neighbor cell of the serving cell will be referred to as a neighbor cell, a first cell, or a first eNB (eNB1).

In a second step, the on-cell may transmit the determined power value to neighbor cells via an X2 interface, an SI interface, or an air interface. The on-cell may also indicate the determined power value to UEs connected to the on-cell by an RRC signal or a MAC signal. Upon receipt of the power value, the UEs may use this information in measuring signals received from serving cells.

In a third step, the on-cell or the neighbor cells may adjust an HO offset based on the power value. For example, the on-cell and/or the neighbor cells may increase or decrease the HO offset based on the power value of the on-cell. The on-cell and/or the neighbor cells may transmit the adjusted HO offset to UEs and the UEs may perform a handover procedure based on the adjusted HO offset.

In a fourth step, the on-cell and/or the neighbor cells may control the power of the on-cell to a level that enables coverage of a service area expanded/shrunken by the adjusted HO offset with an old HO offset. The on-cell may indicate the determined on-power to the neighbor cells and/or UEs. Or before the control of on-power, the on-cell and/or the neighbor cells may indicate a power control time and power values to the neighbor cells and the UEs.

In a final step, the third and fourth steps are repeated (n−1) times.

Now a detailed description will be given of methods for controlling power in N steps, in the case of cell power-on according to embodiments of the present invention.

2.2.1 Method for Adjusting HO Offset by On-Cell

Figure 12:
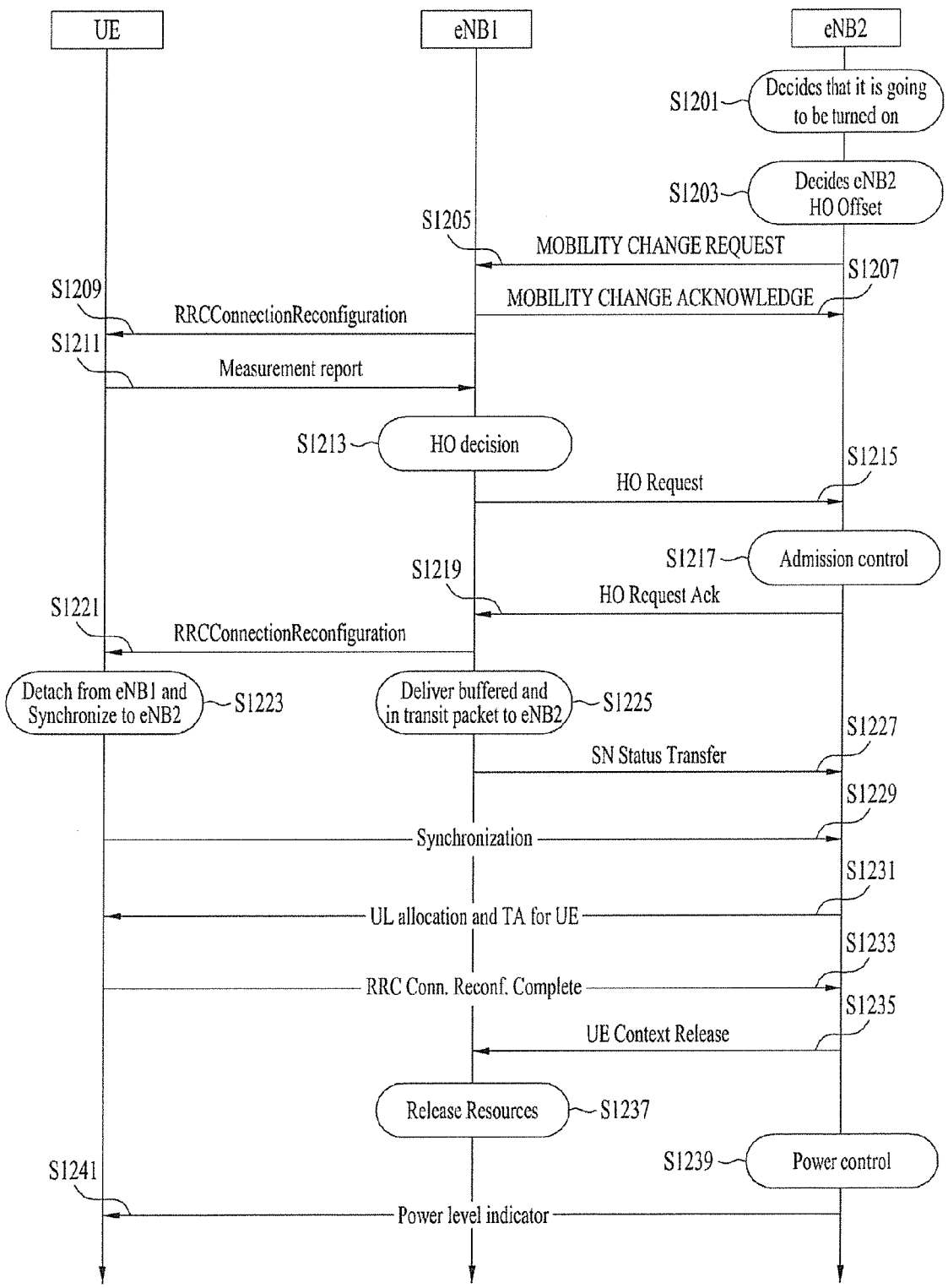
FIG. 12 is a diagram illustrating a signal flow for one of methods for adjusting a HandOver (HO) offset to determine transmission power by an on-cell.

FIG. 12 is a diagram illustrating a signal flow for one of methods for adjusting an HO offset to determine transmission power by an on-cell.

Referring to FIG. 12, a second cell (i.e. eNB2) may decide on cell-on. The cell-on of the second cell may be determined by another serving cell or a network (S1201).

The second cell may determine an initial transmission power to be a minimum, maximum, or specific transmission power according to its cell coverage. The specific transmission power is a power value that the on-cell or neighbor cells determine in consideration of the influence of the transmission power of the on-cell on the neighbor cells. The initial transmission power value may be transmitted and received via an X2 interface or an air interface. The initial transmission power may be transmitted to UEs connected to the second cell by a higher layer signal such as an RRC signal or a MAC signal (not shown).

Subsequently, the second cell may adjust its related HO offset based on the initial transmission power value and/or the cell coverage. A variation by which the HO offset is changed may be preset or determined by the second cell (S1203).

The HO offset determined in step S1203 may be used for a UE corresponding to the coverage of the second cell to perform handover to the second cell, upon power-on of the second cell. That is, if the second cell is powered on, whether a UE connected to a first cell being a neighbor serving cell will perform handover may be determined according to Event A3 described in Clause 1.3. Here, the second cell may determine to increase its related HO offset (e.g., Ofs, Ocs, Off, Hys, etc.) (refer to [Equation 1]).

The second cell transmits the HO offset determined in step S1203 to the neighbor cell, that is, the first cell by a MOBILITY CHANGE REQUEST message. While only the single first cell is shown as a neighbor cell in FIG. 12 for the convenience of description, a plurality of neighbor cells may exist. In this case, the HO offset may be transmitted to two or more of the neighbor cells or all of the neighbor cells (S1205).

The MOBILITY CHANGE REQUEST message of step S1205 is used, when HO parameters (e.g., an HO offset, etc.) are changed, to transmit the changed HO parameters between eNBs in an LTE system. The MOBILITY CHANGE REQUEST message includes cell IDs of the first and second cells. In addition, the MOBILITY CHANGE REQUEST message may include information about an increment or decrement of a cell-specific, frequency-specific, or UE-specific HO offset.

In another aspect of the present invention, if a UE-specific HO offset is changed, the first cell may locate a UE adjacent to the second cell (or a UE connected to the first cell) in advance and may transmit the C-RNTI of the UE to the second cell via the X2 interface before the second cell adjusts the HO offset. The first cell may also transmit measurements reported by the UE to the second cell. Then the second cell may determine an HO offset adjustment value for the UE for which an HO offset should be adjusted. The second cell may also transmit the C-RNTI of the UE connected to the first cell and an adjustment value of the UE-specific HO offset of the UE to neighbor cells by a MOBILITY CHANGE REQUEST message in step S1205.

With continued reference to FIG. 12, the first cell transmits, to the second cell, a MOBILITY CHANGE ACKNOWLEDGE message indicating whether the adjusted HO parameter has been received in response to the MOBILITY CHANGE REQUEST message (S1207).

If the second cell receives the MOBILITY CHANGE ACKNOWLEDGE message from the first cell within a predetermined time (a timer may be used) after transmitting the MOBILITY CHANGE REQUEST message to the second cell, the second cell may notify UEs served by the second cell of the change of the HO offset related to the second cell by an RRC signal, RRCConnectionReconfiguration (not shown). The first cell may transmit the HO offset related to the second cell received from the second cell to UEs within the first cell by an RRCConnectionReconfiguration message (S1209).

Upon receipt of the RRCConnectionReconfiguration message, the UE updates HO parameters used for a measurement event triggering condition based on the HO offset. Further, the UE may measure neighbor cells to determine whether to perform HO using the updated HO parameters (not shown).

The UE transmits the measurements to a current serving cell, that is, the first cell by a Measurement Report message (S1211).

The first cell may determine whether to perform HO for the UE based on measurement result information included in the Measurement Report message (S1213).

When determining HO for the UE, the first cell transmits an HO Request message including an ID of the UE (e.g., the C-RNTI of the UE) to the second cell (S1215).

The second cell performs admission control for the UE in regard to the HO Request message (S1217).

Then the second cell transmits an HO Request ACK message to the first cell in order to admit the HO of the UE (S1219).

After the HO admission, the first cell commands the UE to start an HO procedure by transmitting an RRCConnectionReconfiguration message to the UE (S1221).

The UE is detached from the first cell and synchronized to eNB2 (S1223).

The first cell stores data to be transmitted to the UE in a buffer and prepares to transmit the transmission data to the second cell (S1225).

The first cell transmits a Sequence Number (SN) Status Transfer message to the second cell to indicate the SN of the buffered data to the second cell (S1227).

The UE receives a synchronization signal such as a Primary Synchronization Signal/Secondary Synchronization Signal (PSS/SSS) from the second cell and performs an RACH procedure, thereby performing a synchronization procedure to acquire synchronization to the second cell (S1229).

The second cell allocates UL resources to the UE and transmits a Timing Advance (TA) value to the UE (S1231).

The UE transmits an RRCConnectionReconfiguration Complete message to the second cell, using the allocated UL resources (S1233).

The second cell requests release of UE information by transmitting a UE Context Release message to the first cell that still maintains the UE information (S1235).

Upon receipt of the UE Context Release message, the first cell determines that the HO procedure has been completed successfully and releases the resources allocated to the UE and the UE context of the UE (S1237).

The second cell may control the transmission power value of the second cell and/or the UE that has performed HO to the second cell, based on the HO offset determined in step S1203. For example, the second cell may increase its transmission power so as to cover the coverage of the second cell expanded by the determined HO offset (S1239).

The second cell transmits a transmission power value to the UE so that the UE may successfully transmit and receive data and/or messages to and from the second cell using the transmission power value. For this purpose, the second cell transmits a Power Level Indicator message including the controlled transmission power value to the UE. The Power Level Indicator message may be broadcast or unicast to the UE (S1241).

In addition, the second cell may transmit the transmission power value changed by cell-on to the neighbor cell via the X2 interface or the air interface (not shown).

In step S1241, the second cell may also transmit information about a variation of the transmission power and/or information about a power control time in the Power Level Indicator message. In this case, the second cell may change the transmission power at a time indicated by the time information.

The second cell may be expanded stepwise according to its coverage. That is, the second cell may be expanded stepwise to a final range that the second cell can cover, starting from a minimum range in consideration of interference to neighbor cells. For this purpose, the second cell may repeat steps S1203 through S1241 (n−1) times. A method for determining 'n' will be described later.

In another aspect of the present invention, the second cell may increase the transmission power to a level that can cover the expanded area, based on the HO offset determined in step S1239. If the changed HO offset is not returned to the old HO offset prior to the control, a UE near to the second cell may additionally perform HO. For example, if the transmission power is controlled by 1 dB with an HO offset adjusted by 1 dB, the coverage of the second cell is eventually expanded by 2 dB. Therefore, after the HO procedure, the second cell may transmit the pre-adjustment HO offset to the UE by an RRCConnectionReconfiguration message. Or to prevent an additional HO, access may be barred for the UE or a message indicating non-measurement may be transmitted to the UE.

Figure 13:
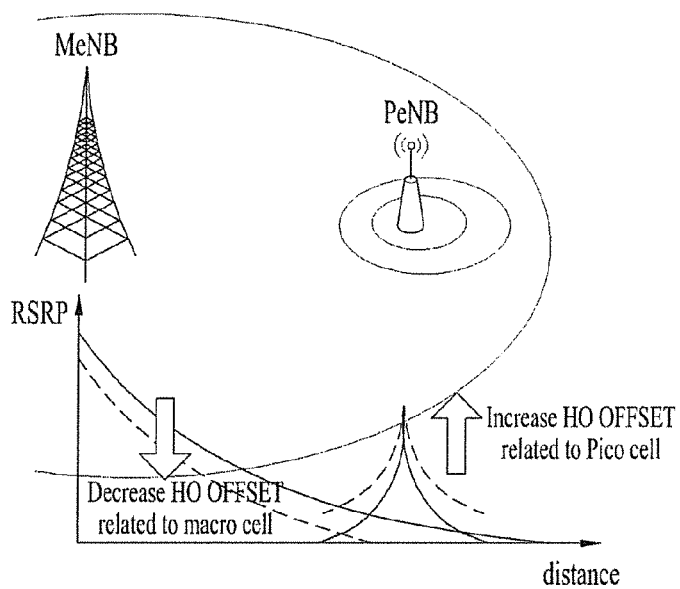

FIG. 13 illustrates a change in the coverage of a second cell, caused by adjustment of an HO offset in the case of cell-on.

With a macro cell overlaid with a pico cell, the pico cell is an on-cell that decides on power-on in the illustrated case of FIG. 13. It is assumed that a first cell is the macro cell and a second cell is the pico cell.

Referring to FIG. 12, after the pico cell determines to be powered on, it may increase its related HO offset (Ofs, Ocs, Off, Hys, etc.). When the pico cell is powered on, the sum of an RSRP and the HO offset that determines the coverage of the pico cell is denoted by a second dotted line. That is, the coverage of the pico cell is expanded.

Therefore, a UE connected to the macro cell near to the pico cell may perform HO to the pico cell. The HO offset may be frequency-specific, cell-specific, or UE-specific. The pico cell may reconfigure the changed HO offset for UEs connected to the pico cell by an RRC signal.

The pico cell may indicate its HO offset adjustment value to the macro cell by transmitting a MOBILITY CHANGE REQUEST message via an X2 interface or an air interface.

Upon receipt of the MOBILITY CHANGE REQUEST message, the macro cell may indicate the adjusted HO offset of UEs within the macro cell. Additionally, the macro cell may transmit measurement configuration information to its connected UEs (UEs located near to the pico cell or specific UEs) in a UE measurement request message or an RRC (re)configuration message so that the UEs may measure radio channels received from neighbor cells.

Upon receipt of the measurement configuration information in the UE measurement request or the RRC reconfiguration message, MUEs (or UEs that have already received the UE measurement request message or the measurement configuration information) measure signals from the pico cell neighboring to the macro cell and transmit measurement report messages to their serving cell according to a measurement configuration. For example, a UE transmits a measure report message periodically or in an event-triggered manner, that is, when a specific event condition is satisfied.

If the HO procedure is triggered by Event 3 (see Clause 1.3), a UE having a measurement satisfying measurement event 3A condition among UEs connected to the macro cell near to the pico cell transmits a measurement report to the macro cell. The macro cell determines whether to allow HO to the pico cell for the UE based on information included in the measurement report message. If the macro cell decides on HO of the UE to the pico cell, the HO procedure defined in LTE Rel-8/9/10 may be performed.

Subsequently, the pico cell may reconfigure the HO offset to an old value or may bar access to the macro cell for the UE to prevent additional HO of the UE. The power of the pico cell may be increased to cover the coverage of the pico cell expanded by the HO offset adjustment in the previous step.

For example, the pico cell may increase the HO offset by 1 dB and then decrease the increased HO offset to the old value by 1 dB. Then the transmission power of the pico cell may be increased by 1 dB.

The pico cell repeats the step of controlling an HO offset through the step of controlling the power of the on-cell and indicating the power control, (n−1) times. The (n−1)-time repetition may minimize interference caused by inaccurate power control.

2.2.2 Method for Adjusting HO Offset by Neighbor Cell

Figure 14:
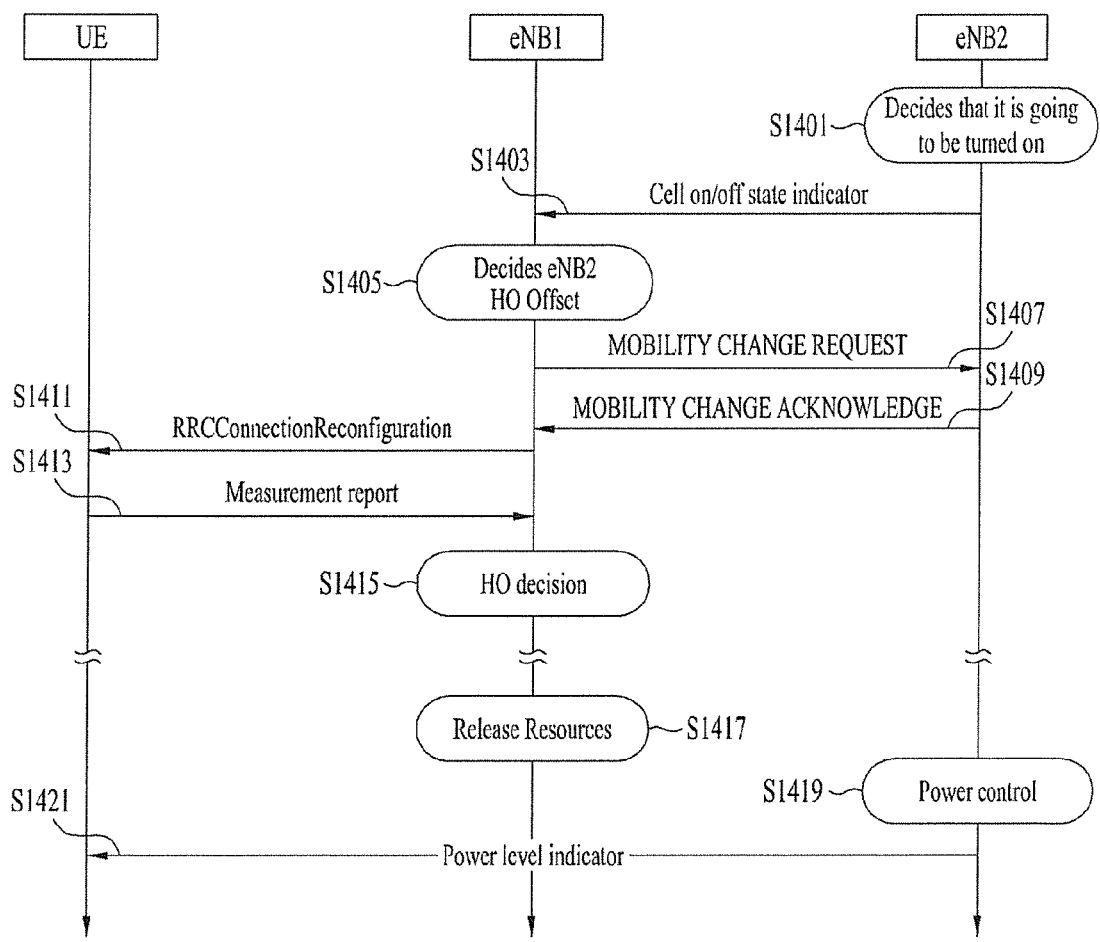
FIG. 14 is a diagram illustrating a signal flow for one of methods for controlling an HO offset of an on-cell by a neighbor cell.

FIG. 14 is a diagram illustrating a signal flow for one of methods for adjusting an HO offset of an on-cell by a neighbor cell.

Referring to FIG. 14, a second cell (i.e. eNB2) may decide on cell-on. The cell-on of the second cell may be determined by another serving cell or a network (S1401).

The second cell may determine an initial on transmission power to be a minimum, maximum, or specific transmission power according to its cell coverage. The specific transmission power is a power value that the on-cell or neighbor cells determine in consideration of the influence of the transmission power of the on-cell on the neighbor cells. The initial on transmission power value may be transmitted and received via an X2 interface or an air interface. The initial on transmission power may be transmitted to UEs connected to the second cell by a higher layer signal such as an RRC signal or a MAC signal (not shown).

The on-cell (eNB2) may transmit a Cell On/Off State Indicator message indicating that it will be powered on to a neighbor cell (eNB1) (S1403).

The Cell On/Off State Indicator message may be transmitted over a backhaul network via an X2 interface or an air interface in operation S1403. The Cell On/Off State Indicator message may include a cell ID (a physical cell ID, a GCID, or the like) of the on-cell, state information indicating the state of the on-cell, a cell ID of the neighbor cell (eNB1), etc.

Or the Cell On/Off State Indicator message may further include the above-described initial on transmission power value in operation S1403. In this case, there is no need for transmitting the initial on transmission power value via the X2 interface or the like.

Upon receipt of the Cell On/Off State Indicator message, the first cell may adjust an HO offset related to the second cell. A variation by which the HO offset is adjusted may be preset in a system or determined by the first cell. The HO offset may be cell-specific, frequency-specific, and/or UE-specific (S1405).

The first cell may transmit the adjusted HO offset (or the HO offset variation) to the second cell by a MOBILITY CHANGE REQUEST message via an X2 interface or the like. The MOBILITY CHANGE REQUEST message may be configured in the same manner as illustrated in FIG. 12 described in Clause 2.2.1 (S1407).

The second cell transmits a MOBILITY CHANGE ACKNOWLEDGE message to the first cell in response to the MOBILITY CHANGE REQUEST message in order to indicate whether a changed HO offset has been received (S1409).

Upon receipt of the MOBILITY CHANGE REQUEST message from the first cell, the second cell may notify UEs connected to the second cell of the change of the HO offset related to the second cell by an RRC signal, RRCConnectionReconfiguration (not shown). The first cell may transmit the HO offset determined in operation S1405 to UEs within the first cell by an RRCConnectionReconfiguration message (S1411).

Upon receipt of the RRCConnectionReconfiguration message, a UE updates HO parameters used for a measurement event triggering condition based on the HO offset. Further, the UE may measure neighbor cells to determine whether to perform HO using the updated HO parameters (not shown).

The UE transmits the measurements to a current serving cell, that is, the first cell by a Measurement Report message (S1413).

The first cell may determine whether to perform HO for the UE based on measurement result information included in the Measurement Report message (S1415).

Subsequently, the UE and the second cell perform the HO procedure of step S1215 through S1235. In addition, upon receipt of a UE Context Release message from the second cell, the first cell releases resources allocated to the UE (S1417).

The second cell may control the transmission power value of the second cell and/or the UE that has performed HO to the second cell, based on the HO offset received in step S1407. For example, the transmission power of the second cell may be increased so as to cover the coverage of the second cell expanded by the HO offset (S1419).

The second cell transmits a transmission power value to the UE so that the UE may successfully transmit and receive data and/or messages to and from the second cell using the transmission power value. For this purpose, the second cell transmits a Power Level Indicator message including the controlled transmission power value to the UE. The Power Level Indicator message may be broadcast or unicast to the UE (S1421).

In addition, the second cell may transmit the transmission power value changed by cell-on to the neighbor cell via the X2 interface or the air interface (not shown).

In FIG. 14, step 1405 of determining an HO offset through step S1421 of indicating the determined HO offset are repeated (n−1) times. Or step 1403 of transmitting a Cell On/Off State Indicator message through step S1421 may be repeated (n−1) times. The step repetition may mitigate interference caused by inaccurate power control.

If the second cell for which power-on is determined is a pico cell in FIG. 14, a macro cell neighboring to the pico cell should increase an HO offset related to the pico cell in order to expand the coverage of the pico cell.

2.2.3 Method for Adjusting HO Offset of Neighbor Cell by On-Cell

Figure 15:
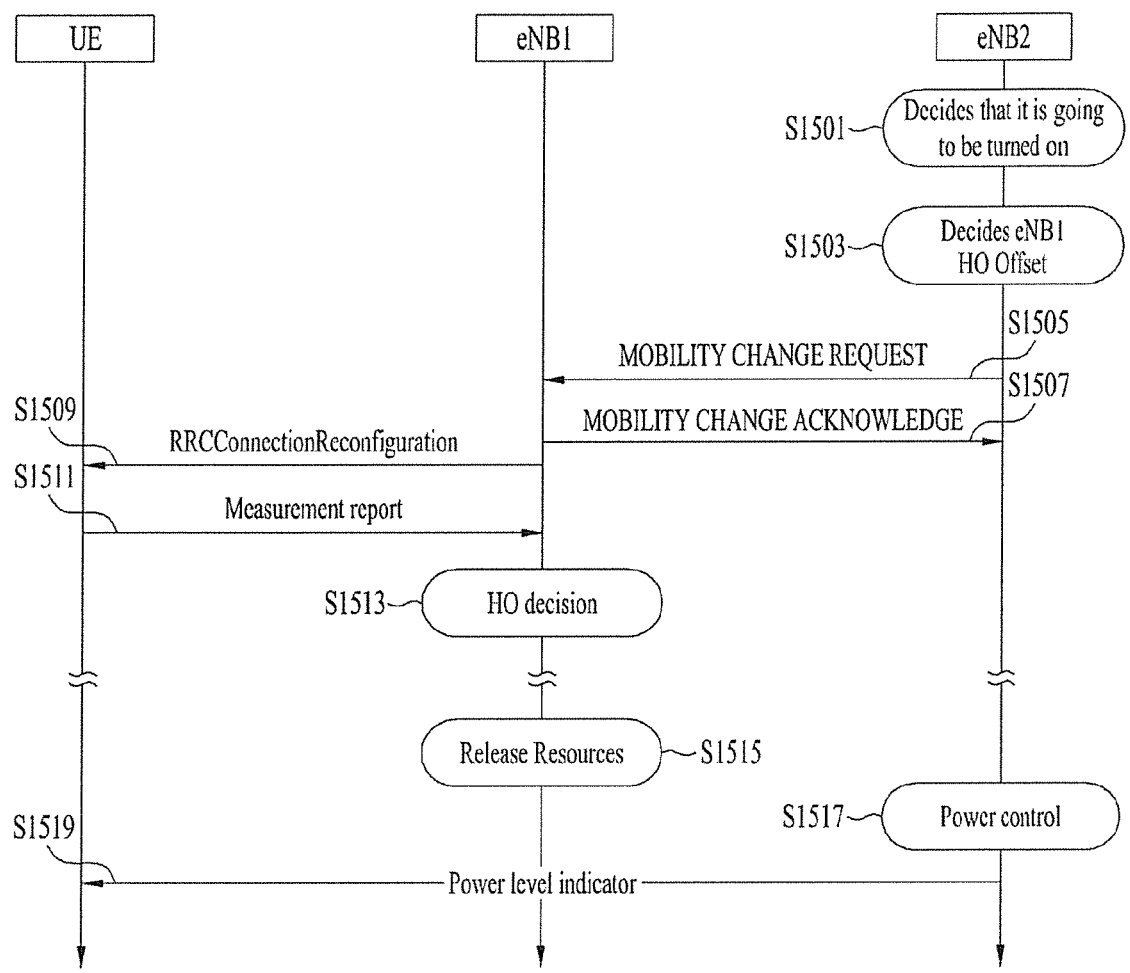
FIG. 15 is a diagram illustrating a signal flow for one of methods for controlling an HO offset of a neighbor cell by an on-cell.

FIG. 15 is a diagram illustrating a signal flow for one of methods for adjusting an HO offset of a neighbor cell by an on-cell.

The method illustrated in FIG. 15 is mostly similar to the method illustrated in FIG. 12, except that a second cell being an on-cell decides on cell-on, the second cell determines an HO offset of a first cell being a neighbor cell instead of an HO offset of the second cell. Accordingly, the following description will focus on the difference from the method of FIG. 12.

Referring to FIG. 15, the second cell may adjust the HO offset of the first cell and may transmit the adjusted HO offset to the first cell by a MOBILITY CHANGE REQUEST message (S1503 and S1505).

In FIG. 15, the second cell may set the HO offset of the first cell to a smaller value than a previous HO offset or to a negative value. For example, it is noted from FIG. 13 that an increased HO offset related to a pico cell and a decreased HO offset related to a macro cell leads to expansion of the coverage of the pico cell. Therefore, if the pico cell decides on cell-on, the pico cell increases its related HO offset in Clause 2.2.1, whereas the pico cell decreases an HO offset related to the macro cell in Clause 2.2.3. In both cases, the coverage of the pico cell may be expanded.

Then the first cell, the second cell, and UEs may control transmission power based on the HO offset of the first cell adjusted by the second cell. That is, the second cell may determine its transmission power based on the HO offset of the first cell and may indicate the transmission power to UEs within the second cell. Step S1501 and steps S1507 through S1519 in FIG. 15 may be pursuant to the description of step S1201 and steps S1207 through S1241 in FIG. 12.

Figure 16:
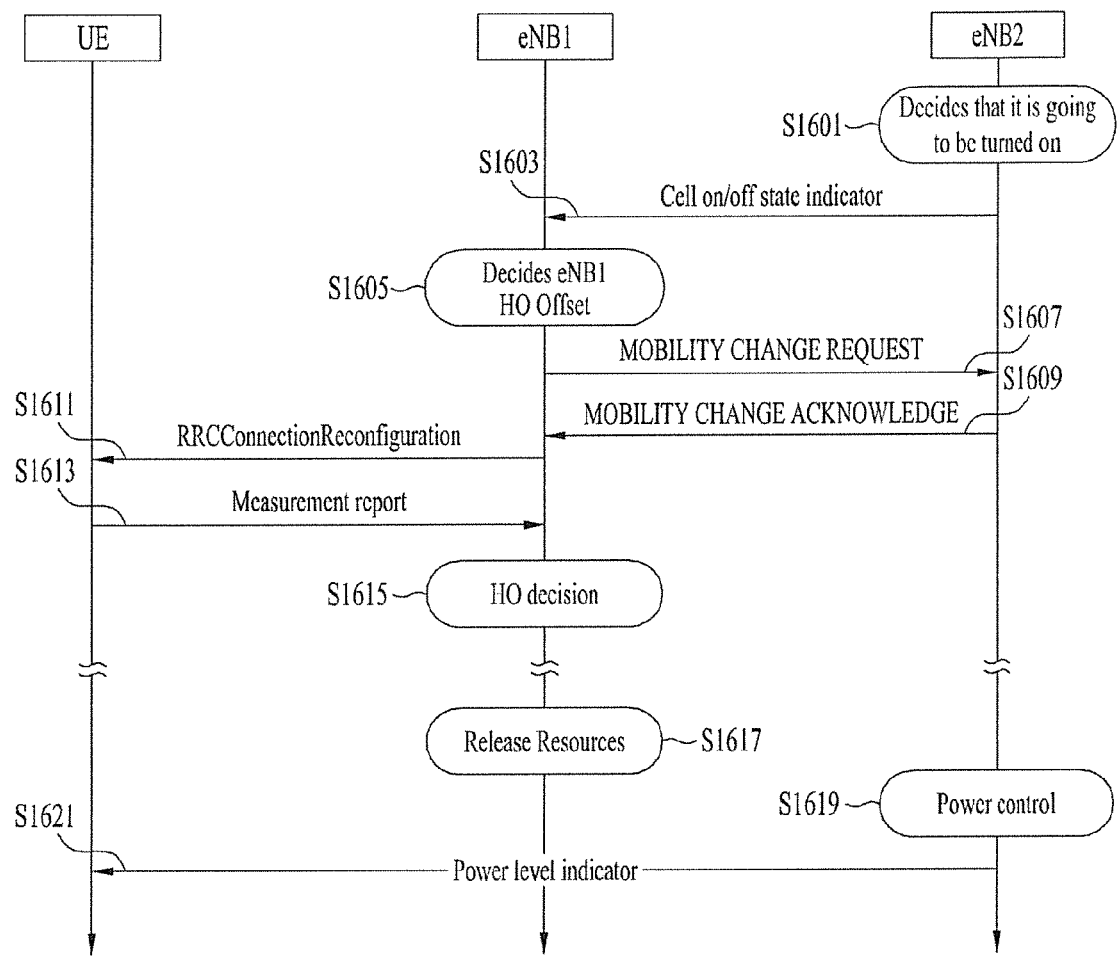

2.2.4 Method for Adjusting HO Offset of Neighbor Cell by Neighbor Cell in Case of Cell On FIG. 16 is a diagram illustrating a signal flow for one of methods for adjusting an HO offset of a neighbor cell by the neighbor cell, in the case of cell-on.

The method illustrated in FIG. 16 is mostly similar to the method illustrated in FIG. 14, except that when a second cell is turned on, a first cell being a neighbor cell adjusts its HO offset. Accordingly, the following description will focus on the difference from the method of FIG. 14.

Referring to FIG. 16, when the second cell decides on cell-on, the second cell indicates its cell-on to the first cell by transmitting a Cell On/Off Indicator message (S1601 and S1603).

Subsequently, the first cell may determine its HO offset in case the second cell will be turned on (S1605).

The first cell may transmit the determined HO offset to the second cell by a MOBILITY CHANGE REQUEST message (S1607).

Then the first cell, the second cell, and UEs may control transmission power based on the HO offset of the first cell adjusted by the first cell. That is, the second cell may determine its transmission power based on the HO offset of the first cell and may indicate the transmission power to UEs within the second cell. Steps S1609 through S1621 in FIG. 16 may be pursuant to the description of steps S1409 through S1421 in FIG. 14.

The method of FIG. 16 will be described in the context of the example illustrated in FIG. 13. Referring to FIG. 13, it is noted that an increased HO offset related to a pico cell and a decreased HO offset related to a macro cell lead to expansion of the coverage of the pico cell. Therefore, if the pico cell decides on cell-on, the macro cell may expand the coverage of the pico cell by setting a small HO offset for the macro cell in Clause 2.2.4.

2.3 Method for Controlling Cell Power in One Step in Case of Cell Off

In embodiments of the present invention, a serving cell which determines to be powered off or is determined to be powered off will be referred to as an off-cell, an off-eNB, a second cell, or a second eNB (eNB2), and a serving cell neighboring to the off-cell will be referred to as a neighbor cell, a neighbor eNB, a first cell, or a first eNB (eNB1).

If power-off of the second cell is determined (by the second cell or a network), the second cell may be powered off in one step.

Or the network (or a neighbor cell) may determine a power value for the second cell, in consideration of the influence of the power of the second cell on the first cell and may transmit the determined power value to the second cell via a backhaul, an X2 interface, an SI interface, or an air interface. Then the second cell may save power by decreasing its power based on the received power value.

Or the second cell may determine a specific power value. The second cell may transmit information about the changed transmission power to the neighboring first cell via the backhaul, the X2 interface, or the air interface. In addition, the second cell may indicate the transmission power to UEs served by the second cell by a higher-layer signal (e.g., an RRC signal or a MAC signal.

2.4 Method for Controlling Power in N Steps, in Case of Cell Off

If power-on of a specific serving cell in on state is determined (by the method described in Clause 2.3), the serving cell may decrease its power to a specific power value. Hereinafter, a serving cell for which power-off is determined will be referred to as an off-cell, a second cell, or a second eNB (eNB2) and a neighbor cell of the serving cell will be referred to as a neighbor cell, a first cell, or a first eNB (eNB1).

In a second step, the off-cell may transmit the decreased power value to the neighbor cell via an X2 interface, an SI interface, or an air interface. The off-cell may also indicate the decreased power value to UEs connected to the off-cell by an RRC signal or a MAC signal. Upon receipt of the power value, the UEs may use this information in measuring signals received from serving cells.

In a third step, the off-cell or the neighbor cell may adjust an HO offset based on the decreased power value. For example, the off-cell and/or the neighbor cell may increase or decrease the HO offset based on the power value of the off-cell. The off-cell and/or the neighbor cell may transmit the adjusted HO offset to a UE and the UE may perform a handover procedure based on the adjusted HO offset.

In a fourth step, the off-cell and/or the neighbor cell may control the power of the off-cell to a level that enables coverage of a service area expanded/shrunken by the adjusted HO offset with an old HO offset. The off-cell may transmit information about the decreased transmission power determined in the above manner to the neighbor cell and/or the UE. Or before the control of off-power, the off-cell and/or the neighbor cell may indicate a power control time and power values to the neighbor cell and the UE.

In a final step, the third and fourth steps are repeated (n−1) times.

Now a detailed description will be given of methods for controlling power in N steps, in the case of cell power-off according to embodiments of the present invention.

2.4.1 Method for Adjusting HO Offset by Off-Cell

Figure 17:
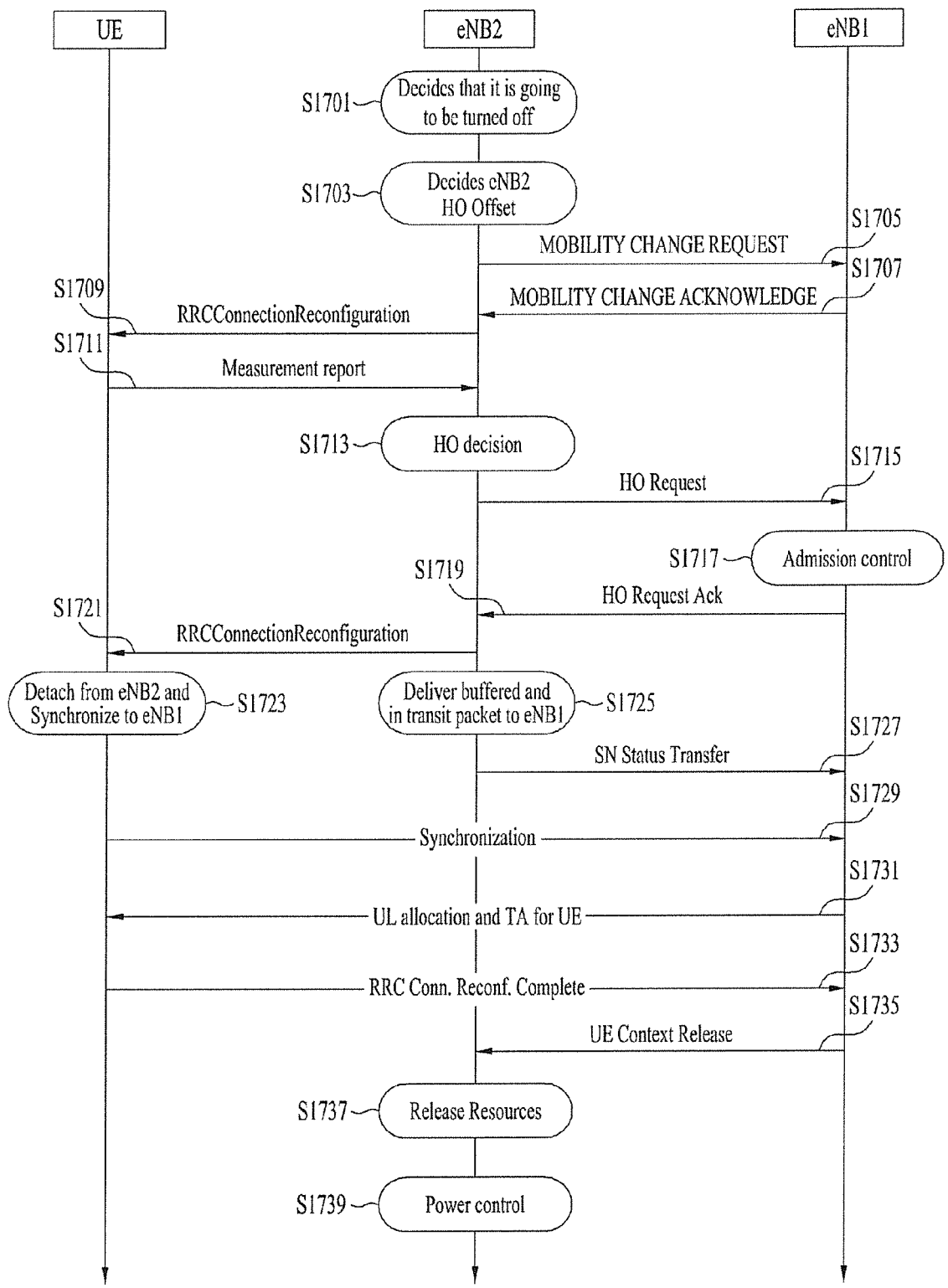
FIG. 17 is a diagram illustrating a signal flow for one of methods for controlling an HO offset to determine transmission power by an off cell

FIG. 17 is a diagram illustrating a signal flow for one of methods for adjusting an HO offset to determine transmission power by an off-cell.

Referring to FIG. 17, a second cell (i.e. eNB2) may decide on cell-off. The cell-off of the second cell may be determined by another serving cell or a network (S1701).

The second cell may determine an initial off transmission power to be a minimum, maximum, or specific transmission power according to its cell coverage to be powered off. The specific transmission power is a power value that the network, the off-cell, or a neighbor cell determines in consideration of the influence of the transmission power of the off-cell on the neighbor cell. The initial off transmission power value may be transmitted and received via an X2 interface or an air interface. The initial off transmission power may be transmitted to a UE connected to the second cell by a higher layer signal such as an RRC signal or a MAC signal (not shown).

Subsequently, the second cell may adjust its related HO offset based on the initial off transmission power value and/or the cell coverage. A variation by which the HO offset is changed may be preset or determined by the second cell (S1703).

The HO offset determined in step S1703 may be used for a UE corresponding to the coverage of the second cell to perform handover to the first cell, upon power-off of the second cell. That is, if the second cell is powered off, whether a UE connected to the second cell will perform handover may be determined according to Event A3 described in Clause 1.3. Here, the second cell may determine to decrease its related HO offset (e.g., Ofs, Ocs, Off, Hys, etc.) (refer to [Equation 1]).

The second cell transmits the HO offset determined in step S1703 to the neighbor cell, that is, the first cell by a MOBILITY CHANGE REQUEST message. While only the single first cell is shown as a neighbor cell in FIG. 17 for the convenience of description, a plurality of neighbor cells may exist. In this case, the HO offset may be transmitted to two or more of the neighbor cells or all of the neighbor cells (S1705).

The MOBILITY CHANGE REQUEST message of step S1705 is used, when HO parameters (e.g., an HO offset, etc.) are changed, to transmit the changed HO parameters between eNBs in an LTE system. The MOBILITY CHANGE REQUEST message includes cell IDs of the first and second cells. In addition, the MOBILITY CHANGE REQUEST message may include information about an increment or decrement of a cell-specific, frequency-specific, or UE-specific HO offset.

In another aspect of the present invention, if a UE-specific HO offset is changed, the first cell may locate a UE adjacent to the second cell (or a UE connected to the first cell) in advance and may transmit the C-RNTI of the UE to the second cell via the X2 interface before the second cell adjusts the HO offset. The first cell may also transmit measurements reported by the UE to the second cell. Then the second cell may determine an HO offset adjustment value for the UE for which an HO offset should be adjusted. The second cell may also transmit the C-RNTI of the UE connected to the first cell and an adjustment value of the UE-specific HO offset of the UE to the neighbor cell by a MOBILITY CHANGE REQUEST message in step S1705.

With continued reference to FIG. 17, the first cell transmits, to the second cell, a MOBILITY CHANGE ACKNOWLEDGE message indicating whether the adjusted HO parameter has been received in response to the MOBILITY CHANGE REQUEST message (S1707).

If the second cell receives the MOBILITY CHANGE ACKNOWLEDGE message from the first cell within a predetermined time (a timer may be used) after transmitting the MOBILITY CHANGE REQUEST message to the second cell, the second cell may notify a UE served by the second cell of the change of the HO offset related to the second cell by an RRC signal, RRCConnectionReconfiguration (S1709). The first cell may transmit the HO offset related to the second cell received from the second cell to a UE within the first cell by an RRCConnectionReconfiguration message (not shown).

Upon receipt of the RRCConnectionReconfiguration message, the UE updates HO parameters used for a measurement event triggering condition based on the HO offset. Further, the UE may measure neighbor cells to determine whether to perform HO using the updated HO parameters (not shown).

The UE transmits the measurements to a current serving cell, that is, the second cell by a Measurement Report message (S1711).

The second cell may determine whether to perform HO for the UE based on measurement result information included in the Measurement Report message (S1713).

When determining HO for the UE, the second cell transmits an HO Request message including an ID of the UE (e.g., the C-RNTI of the UE) to the first cell (S1715).

The first cell performs admission control for the UE in regard to the HO Request message (S1717).

Then the first cell transmits an HO Request ACK message to the second cell in order to admit the HO of the UE (S1719).

After the HO admission, the second cell commands the UE to start an HO procedure by transmitting an RRCConnectionReconfiguration message to the UE (S1721).

The UE is detached from the second cell and synchronized to eNB1 (S1723).

The second cell stores data to be transmitted to the UE in a buffer and prepares to transmit the transmission data to the first cell (S1725).

The second cell transmits an SN Status Transfer message to the first cell to indicate the SN of the buffered data to the first cell (S1727).

The UE receives a synchronization signal such as a PSS/SSS from the first cell and performs an RACH procedure, thereby performing a synchronization procedure to acquire synchronization to the first cell (S1729).

The first cell allocates UL resources to the UE and transmits a Timing Advance (TA) value for use in the first cell to the UE (S1731).

The UE transmits an RRCConnectionReconfiguration Complete message to the first cell, using the allocated UL resources (S1733).

The first cell requests release of UE information by transmitting a UE Context Release message to the second cell that still maintains the UE information (S1735).

Upon receipt of the UE Context Release message, the second cell determines that the HO procedure has been completed successfully and releases the resources allocated to the UE and the UE context of the UE (S1737).

The second cell may control the transmission power value of the second cell and/or the UE, based on the HO offset determined in step S1703 (S1739).

For example, the second cell may increase its transmission power so as to cover the coverage of the second cell expanded by the determined HO offset. If the coverage of the second cell is shrunken by the offset adjustment, the second cell may decrease its transmission power. A variation of the transmission power adjusted by the second cell may be preset in the system or may be set to a variation of the HO offset adjusted by eNB2.

The second cell may transmit information about the transmission power controlled based on the adjusted HO offset to the UE. For this purpose, the second cell may transmit a Power Level Indicator message including the controlled transmission power value to the UE. In addition, the second cell may also transmit information about a variation of the transmission power and/or information about a power control time in the Power Level Indicator message. In this case, the second cell may change the transmission power at a time indicated by the time information. The Power Level Indicator message may be broadcast or unicast to the UE (not shown).

The second cell may also transmit the transmission power value of the second cell changed by the cell-off decision to the neighbor cell via the X2 interface or the air interface (not shown).

The second cell may be shrunken stepwise according to its coverage. That is, the second cell may be shrunken stepwise to be finally power off completely, starting from a minimum range in consideration of interference to the neighbor cell. For this purpose, the second cell may repeat steps S1703 through S1739 (n−1) times. A method for determining 'n' will be described later.

In another aspect of the present invention, the second cell may transmit an old HO offset before the adjustment of the HO offset to the UE by an RRCConnectionReconfiguration message, after the HO procedure in FIG. 17 (not shown). Or to prevent an additional HO, access may be barred for the UE or a message indicating non-measurement may be transmitted to the UE.

Figure 18:
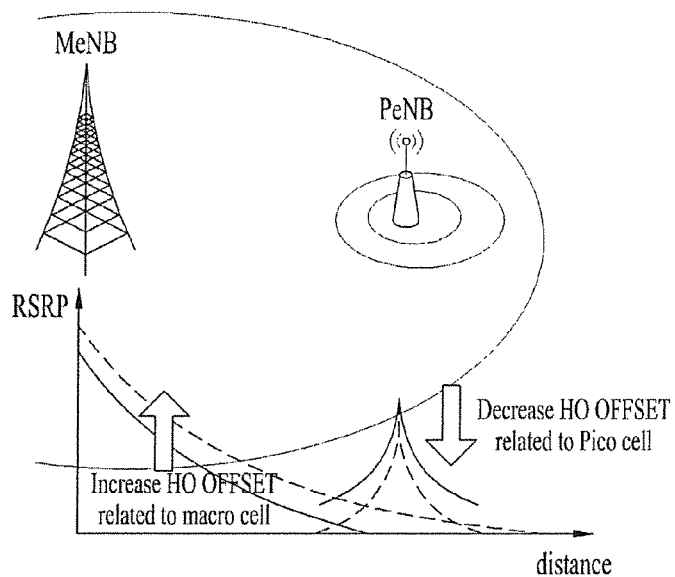
FIG. 18 illustrates a change in the coverage of a second cell according to control of an HO offset, in the case of cell off.

FIG. 18 illustrates a change in the coverage of a second cell, caused by adjustment of an HO offset in the case of cell-off.

With a macro cell overlaid with a pico cell, the pico cell is an off-cell that decides on power-off in the illustrated case of FIG. 18. It is assumed that a first cell is the macro cell and a second cell is the pico cell.

Referring to FIG. 18, after the pico cell determines to be powered off, it may decrease its related HO offset (Ofs, Ocs, Off, Hys, etc.). When the pico cell is powered off, the sum of an RSRP and the HO offset is denoted by a second dotted line. That is, the coverage of the pico cell is shrunken.

Therefore, a UE connected to the pico cell near to the macro cell may perform HO to the neighboring macro cell. The HO offset may be frequency-specific, cell-specific, or UE-specific. The pico cell may reconfigure the changed HO offset for UEs connected to the pico cell by an RRC signal.

The pico cell may indicate its HO offset adjustment value to the macro cell by transmitting a MOBILITY CHANGE REQUEST message. It is assumed herein that the pico cell and the macro cell are connected via an X2 interface or an air interface.

Upon receipt of HO offset, the macro cell may indicate the adjusted HO offset of UEs within the macro cell. Additionally, the macro cell may transmit measurement configuration information to its connected UEs (UEs located near to the pico cell or specific UEs) in a UE measurement request message or an RRC (re)configuration message so that the UEs may measure radio channels received from neighbor cells.

Upon receipt of the measurement configuration information in the UE measurement request or the RRC reconfiguration message, PUEs (or UEs that have already received the UE measurement request message or the measurement configuration information) measure signals from the macro cell neighboring to the pico cell and transmit measurement report messages to their serving cell, that is, the pico cell according to a measurement configuration. For example, a UE transmits a measure report message periodically or in an event-triggered manner, that is, when a specific event condition is satisfied.

If the HO procedure is triggered by Event 3 (see Clause 1.3), a UE having a measurement satisfying measurement event 3A condition among UEs connected to the pico cell near to the macro cell transmits a measurement report to the pico cell. The pico cell determines whether to allow HO to the macro cell for the UE based on information included in the measurement report message. If the pico cell decides on HO of the UE to the macro cell, the UE may perform the HO procedure defined in LTE Rel-8/9/10 with the macro cell.

Subsequently, the pico cell may reconfigure the HO offset to an old value or may bar access to the macro cell for the UE to prevent additional HO of the UE. The power of the pico cell may be increased to cover the coverage of the pico cell expanded by the HO offset adjustment in the previous step.

For example, the pico cell may decrease the HO offset by 1 dB and then increase the increased HO offset to the old value by 1 dB. Then the transmission power of the pico cell may be decreased by 1 dB.

The pico cell repeats the step of controlling an HO offset through the step of controlling the power of the off-cell and indicating the power control, (n−1) times. The (n−1)-time repetition may minimize interference caused by inaccurate power control.

2.4.2 Method for Adjusting HO Offset by Neighbor Cell

Figure 19:
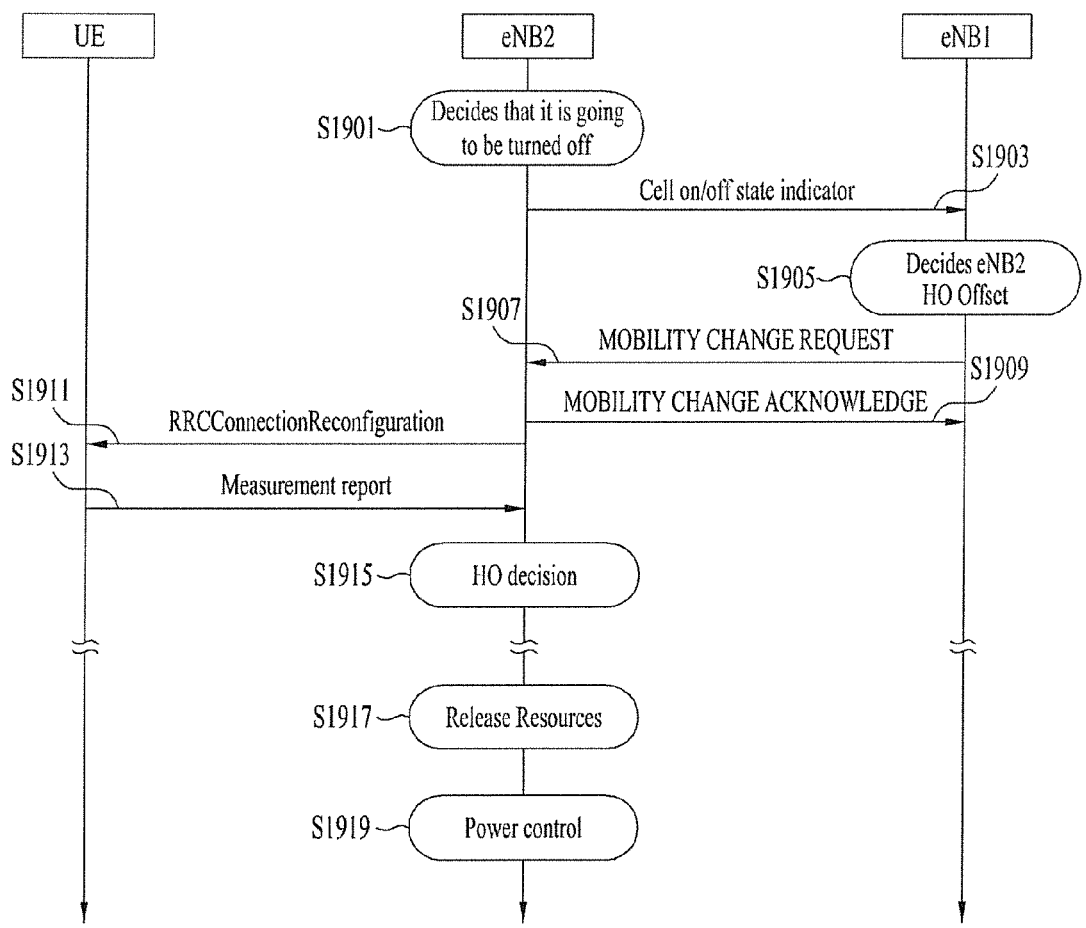
FIG. 19 is a diagram illustrating a signal flow for one of methods for controlling an HO offset of an off cell by a neighbor cell.

FIG. 19 is a diagram illustrating a signal flow for one of methods for adjusting an HO offset of an off-cell by a neighbor cell.

Referring to FIG. 19, a second cell (i.e. eNB2) may decide on cell-off. The cell-off of the second cell may be determined by another serving cell or a network (S1901).

The second cell may determine an initial off transmission power to be a minimum, maximum, or specific transmission power according to its cell coverage. The specific transmission power is a power value that the off-cell or neighbor cells determine in consideration of the influence of the transmission power of the off-cell on the neighbor cells. The initial off transmission power value may be transmitted and received via an X2 interface or an air interface. The initial off transmission power may be transmitted to UEs connected to the second cell by a higher layer signal such as an RRC signal or a MAC signal (not shown).

The second cell (eNB2) may transmit a Cell On/Off State Indicator message indicating that it will be powered off to the first cell (eNB1) (S1903).

The Cell On/Off State Indicator message may be transmitted over a backhaul network via an X2 interface or an air interface in operation S1903. The Cell On/Off State Indicator message may include a cell ID (a physical cell ID, a GCID, or the like) of the off-cell, state information indicating the state of the off-cell, a cell ID of the neighbor cell (eNB1), etc.

Upon receipt of the Cell On/Off State Indicator message, the first cell may adjust an HO offset related to the second cell. A variation by which the HO offset is adjusted may be preset in a system or determined by the first cell. The HO offset may be cell-specific, frequency-specific, and/or UE-specific (S1905).

The first cell may transmit the adjusted HO offset (or the HO offset variation) to the second cell by a MOBILITY CHANGE REQUEST message via an X2 interface or the like. The MOBILITY CHANGE REQUEST message may be configured in the same manner as illustrated in FIG. 17 described in Clause 2.4.1 (S1907).

The second cell transmits a MOBILITY CHANGE ACKNOWLEDGE message to the first cell in response to the MOBILITY CHANGE REQUEST message in order to indicate whether a changed HO parameter has been received (S1909).

Upon receipt of the MOBILITY CHANGE REQUEST message from the first cell, the second cell may notify UEs connected to the second cell of the change of the HO offset related to the second cell by an RRC signal, RRCConnectionReconfiguration message (S1911). The first cell may transmit the HO offset determined in operation S1905 to UEs within the first cell by an RRCConnectionReconfiguration message (not shown).

Upon receipt of the RRCConnectionReconfiguration message, a UE updates HO parameters used for a measurement event triggering condition based on the HO offset. Further, the UE may measure neighbor cells to determine whether to perform HO using the updated HO parameters (not shown).

The UE transmits the measurements to a current serving cell, that is, the second cell by a Measurement Report message (S1913).

The second cell may determine whether to perform HO for the UE based on measurement result information included in the Measurement Report message (S1915).

Subsequently, the UE and the second cell perform the HO procedure of step S1715 through S1735. In addition, upon receipt of a UE Context Release message from the first cell, the second cell releases resources allocated to the UE (S1917).

The second cell may control the transmission power value of the second cell and/or the UE that has performed HO to the second cell, based on the HO offset received in step S1907. For example, the transmission power of the second cell may be decreased so as to cover the coverage of the second cell shrunken by the HO offset (S1919).

The second cell transmits a transmission power value to the UE so that the UE may successfully transmit and receive data and/or messages to and from the second cell using the transmission power value. For this purpose, the second cell transmits a Power Level Indicator message including the controlled transmission power value to the UE. The Power Level Indicator message may be broadcast or unicast to the UE (not shown).

In addition, the second cell may transmit the transmission power value changed by cell-off to the neighbor cell via the X2 interface or the air interface (not shown).

In FIG. 19, step 1905 of determining an HO offset through step S1921 of indicating the determined HO offset are repeated (n-1) times. Or step 1903 of transmitting a Cell On/Off State Indicator message through step S1921 may be repeated (n-1) times. The step repetition may mitigate interference caused by inaccurate power control.

If the second cell for which power-off is determined is a pico cell in FIG. 19, a macro cell neighboring to the pico cell should increase an HO offset related to the pico cell in order to shrink the coverage of the pico cell.

2.4.3 Method for Adjusting HO Offset of Neighbor Cell by Off-Cell

Figure 20:
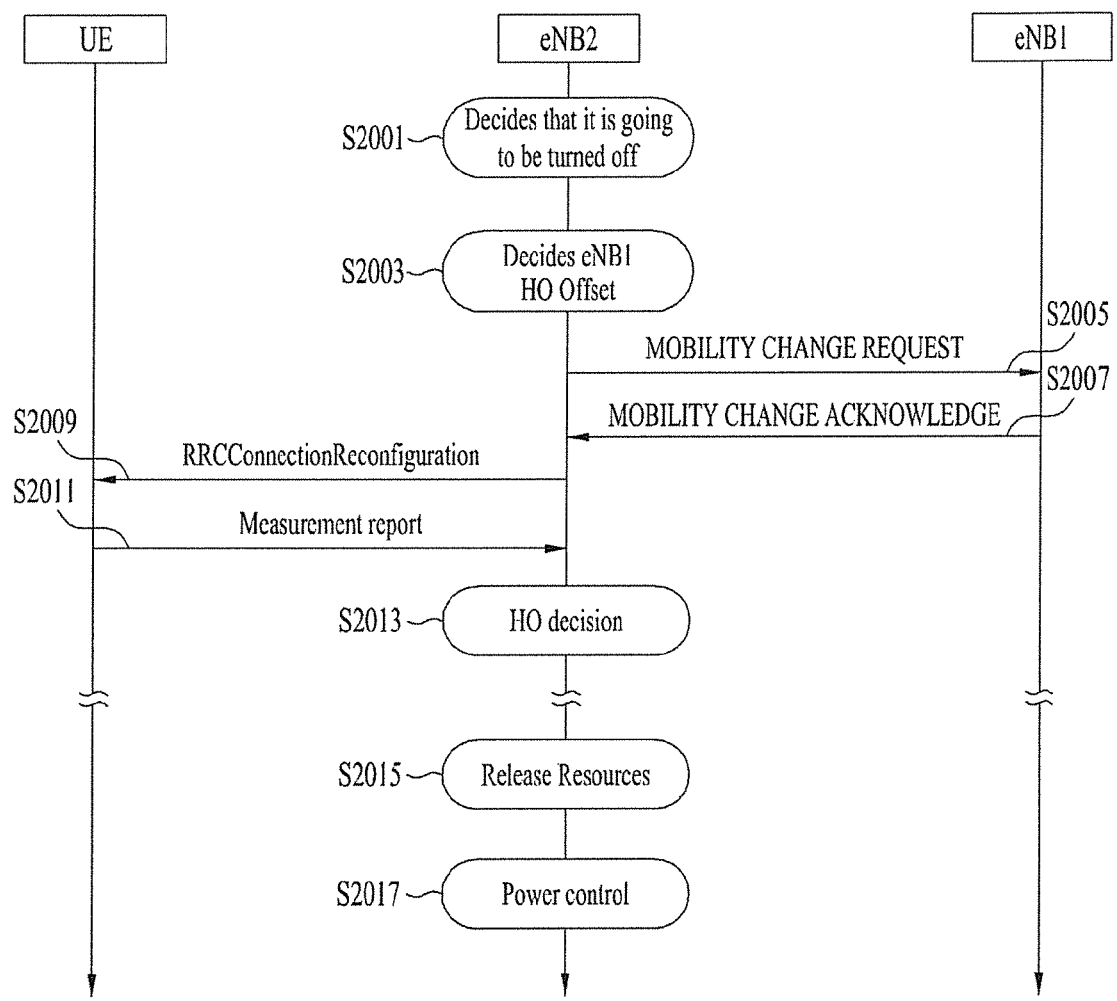
FIG. 20 is a diagram illustrating a signal flow for one of methods for controlling an HO offset of a neighbor cell by an off cell.

FIG. 20 is a diagram illustrating a signal flow for one of methods for adjusting an HO offset of a neighbor cell by an off-cell.

The method illustrated in FIG. 20 is mostly similar to the method illustrated in FIG. 17, except that a second cell being an off-cell decides on cell-off, the second cell determines an HO offset of a first cell being a neighbor cell instead of an HO offset of the second cell. Accordingly, the following description will focus on the difference from the method of FIG. 17.

Referring to FIG. 20, the second cell may adjust the HO offset of the first cell and may transmit the adjusted HO offset to the first cell by a MOBILITY CHANGE REQUEST message (S2003 and S2005).

In FIG. 20, the second cell may set the HO offset of the first cell to a larger value than a previous HO offset or to a positive value. For example, it is noted from FIG. 18 that a decreased HO offset related to a pico cell and an increased HO offset related to a macro cell leads to shrinking of the coverage of the pico cell. Therefore, if the pico cell decides on cell-off, the pico cell decreases its related HO offset in Clause 2.4.1, whereas the pico cell increases an HO offset related to the macro cell in Clause 2.4.3. In both cases, the coverage of the pico cell may be shrunken.

Then the first cell, the second cell, and UEs may control transmission power based on the HO offset of the first cell adjusted by the second cell. That is, the second cell may determine its transmission power based on the HO offset of the first cell and may indicate the transmission power to UEs within the second cell. Step S2001 and steps S2007 through S2017 in FIG. 20 may be pursuant to the description of step S1701 and steps S1707 through S1741 in FIG. 17.

Figure 21:
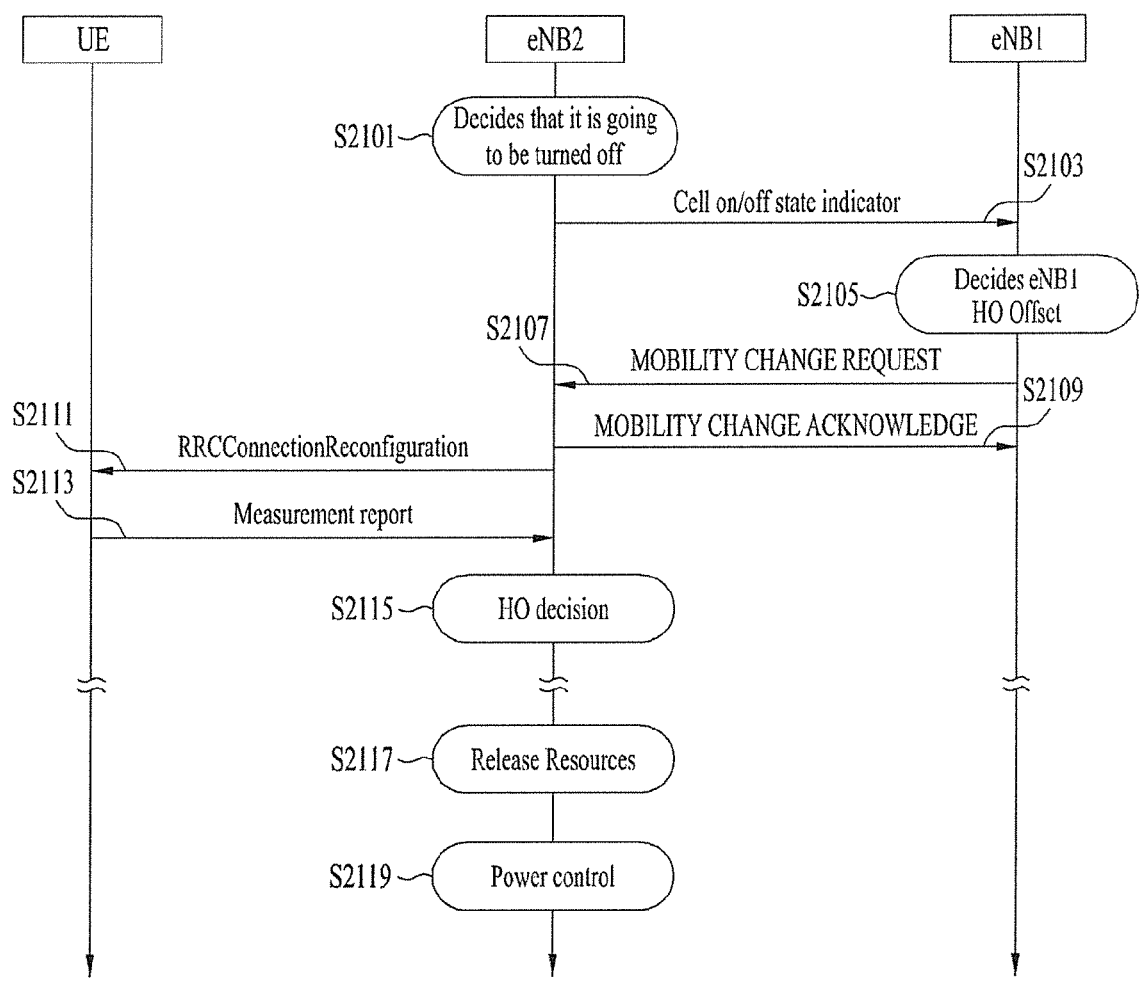
FIG. 21 is a diagram illustrating a signal flow for one of methods for controlling an HO offset of a neighbor cell by the neighbor cell, in the case of cell off.

2.4.4 Method for Adjusting HO Offset of Neighbor Cell by Neighbor Cell in Case of Cell Off FIG. 21 is a diagram illustrating a signal flow for one of methods for adjusting an HO offset of a neighbor cell by the neighbor cell, in the case of cell-off.

The method illustrated in FIG. 21 is mostly similar to the method illustrated in FIG. 19, except that when a second cell is turned off, a first cell being a neighbor cell adjusts its HO offset. Accordingly, the following description will focus on the difference from the method of FIG. 19.

Referring to FIG. 21, when the second cell decides on cell-off, the second cell indicates its cell-off to the first cell by transmitting a Cell On/Off Indicator message (S2101 and S2103).

Subsequently, the first cell may determine its HO offset in case the second cell will be turned off (S2105).

The first cell may transmit the determined HO offset of the first cell to the second cell by a MOBILITY CHANGE REQUEST message (S2107).

Then the first cell, the second cell, and UEs may control transmission power based on the HO offset of the first cell adjusted by the first cell. That is, the second cell may determine its transmission power based on the HO offset of the first cell and may indicate the transmission power to UEs within the second cell. Steps S2109 through S2119 in FIG. 21 may be pursuant to the description of steps S1909 through S1919 in FIG. 19.

The method of FIG. 21 will be described in the context of the example illustrated in FIG. 18. Referring to FIG. 18, it is noted that a decreased HO offset related to a pico cell and an increased HO offset related to a macro cell lead to shrinking of the coverage of the pico cell. Therefore, if the pico cell decides on cell-off, the macro cell may shrink the coverage of the pico cell by setting a large HO offset for the macro cell in Clause 2.4.4.

2.5 Method for Determining Repetition Number n in Case of Cell On/Off

A description will be given of methods for determining the repetition number n of steps in the case where a specific is powered on/off. The following description is given with the appreciation that an on-cell/off-cell is a second cell and a neighbor cell of the on-cell/off-cell is a first cell, by way of example. Thus methods for determining the repetition number n of steps for controlling power on/off of the second cell in the embodiments of the present invention will be described below. In the following cases, the power-on/off procedure of the second cell may be discontinued.

2.5.1 Repetition Number in Case of Cell On (1) Case where the Transmission Power of the Second Cell is Equal to or Larger than its Maximum Transmission Power.

For example, if cell-on of the second cell is determined, the transmission power of the second cell may be increased stepwise by repeating one of the afore-described embodiments. If the transmission power of the second cell is equal to or larger than the maximum transmission power, the procedure for increasing the transmission power of the second cell may be discontinued.

That is, the repetition number N may be set to a value by which the transmission power of the second cell reaches the maximum transmission power.

(2) Case where the RSRP or RSRQ of a Serving Cell Measured by a UE Connected to the First Cell Neighboring to the Second Cell is Equal to or Lower than a Predetermined Threshold.

The threshold may be preset in the system or determined by an eNB. The threshold may be cell-specific or UE-specific and the eNB may indicate the threshold to a UE by an RRC signal or a MAC signal. The first cell neighboring to the second cell may transmit a message requesting discontinuation of power control of the second cell via an X2 interface or an air interface.

For example, if the second cell is to be powered on, the first cell may be interfered by the second cell. If the RSRP or RSRQ of a serving cell measured by a UE connected to the first cell is equal to or lower than the threshold, the procedure for increasing the power of the second cell is discontinued.

That is, the repetition number N may be set to a value by which the transmission power of the second cell reaches the threshold.

(3) Case where the RSRP or RSRQ of the Second Cell Measured by a UE Connected to the First Cell is Equal to or Higher than a Predetermined Threshold.

The threshold may be preset in the system or determined by an eNB. The threshold may be cell-specific or UE-specific and the eNB may signal the threshold to a UE by an RRC signal or a MAC signal. The first cell neighboring to the second cell may transmit a message requesting discontinuation of power control of the second cell via the X2 interface or the air interface.

For example, if the second cell is to be powered on, the first cell may be interfered by the second cell. If the RSRP or RSRQ of the second cell measured by a UE connected to the first cell is equal to or higher than the threshold, the procedure for increasing the power of the second cell is discontinued.

That is, the repetition number N may be set to a value by which the transmission power of the second cell reaches the threshold of the first cell.

(4) Case where the RSRP or RSRQ of the First Cell Measured by a UE Connected to the First Cell is Equal to or Lower than a Predetermined Threshold.

For example, if the second cell is to be powered on. If the RSRP or RSRQ of the first cell measured by a UE connected to the second cell is equal to or lower than the threshold, a procedure for increasing the power of the second cell may be discontinued.

That is, the repetition number N may be set to a value by which the transmission power of the second cell reaches the threshold of the second cell.

2.5.2 Repetition Number in Case of Cell Off (1) Case where the Transmission Power of the Second Cell is Equal to or Lower than its Minimum Transmission Power.

For example, if cell-off of the second cell is determined, the transmission power of the second cell may be decreased stepwise by repeating one of the afore-described embodiments. If the transmission power of the second cell is equal to or lower than the minimum transmission power, the procedure for decreasing the transmission power of the second cell may be discontinued.

That is, the repetition number N may be set to a value by which the transmission power of the second cell reaches the minimum transmission power.

(2) Case where the Transmission Power of the Second Cell is 0.

For example, if cell-off of the second cell is determined, the transmission power of the second cell may be decreased by repeating one of the afore-described embodiments. If the transmission power of the second cell is 0, which implies that the second cell is completely powered off, the procedure for decreasing the transmission power of the second cell may be discontinued.

That is, the repetition number N may be set to a value by which the transmission power of the second cell reaches 0.

(3) Case where the RSRP or RSRQ of a Serving Cell Measured by a UE Connected to the Second Cell is Equal to or Lower than a Predetermined Threshold.

For example, if the second cell is powered off and the transmission power of a serving cell measured by a UE connected to the second cell is equal to or lower than the predetermined threshold, the procedure for decreasing the transmission power of the second cell may be discontinued.

That is, the repetition number N may be set to a value by which the transmission power of the second cell reaches the predetermined threshold.

3. Implementation Apparatus

Figure 22:
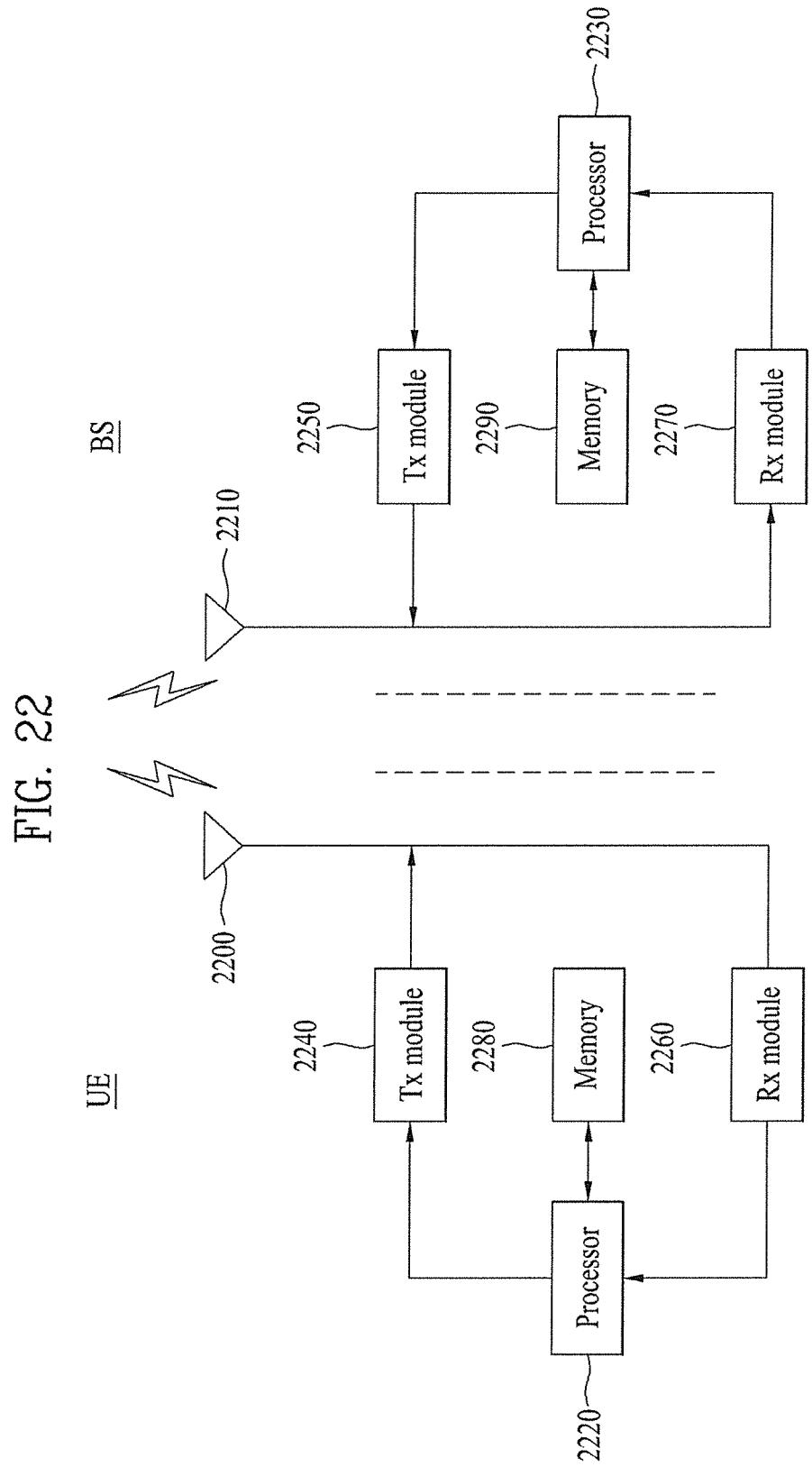
FIG. 22 is a block diagram of apparatuses that can implement the methods described in FIGS. 1 to 21.

The apparatus described with reference to FIG. 22 can implement the methods described in FIGS. 1 to 21.

A UE may operate as a transmitter in uplink and operate as a receiver in downlink. In addition, a BS (eNB) may operate a receiver in uplink and operate as a transmitter in downlink.

That is, the UE and the BS may respectively include transmitter 2240 and 2250 and receiver 2260 and 2270, in order to control transmission and reception of information, data and/or message. The UE and the BS may include antennas 2200 and 2210 for transmitting/receiving information, data and/or messages, respectively.

The UE and the BS may include processors 2220 and 2230 for performing the above-described embodiments of the present invention and memories 2280 and 2290 for temporarily or permanently storing processing procedures of the processors, respectively.

The embodiments of the present invention may be implemented using the above-described components and functions of the UE and the BS. For example, the processors of the UE and/or the BS may control transmission power in the case of cell on/off in one step or stepwise by combining the methods described in Clause 1 to Clause 2. Therefore, interference with a neighbor cell may be minimized.

Particularly, when the second cell is powered on/off, the transmission power of the second cell may be controlled by adjusting an HO offset of the first cell and/or the second cell. If the transmission power is controlled stepwise, the aforedescribed HO offset adjustment method may be repeated a predetermined number of times.

While a serving cell is a predetermined frequency area and/or a geographical area managed by an eNB in the embodiments of the present invention, the terms serving cell and eNB may be interchangeably used.

The transmitter and the receiver included in the UE and the BS may perform a packet modulation/demodulation function for data transmission, a high-speed packet channel coding function, an orthogonal frequency division multiple access (OFDMA) packet scheduling function, a time division duplexing (TDD) packet scheduling function and/or a channel multiplexing function. The UE and the BS of FIG. 22 may further include a low-power radio frequency (RF)/Intermediate frequency (IF) module.

Meanwhile, in the present invention, as a UE, a personal digital assistant (PDA), a cellular phone, a personal communication service (PCS) phone, a global system for mobile (GSM) phone, a wideband CDMA (WCDMA) phone, a mobile broadband system (MBS) phone, a handheld personal computer (PC), a laptop, a smart phone or a multi mode-multi band (MM-MB) terminal may be used.

The smart phone refers to a terminal which has merits of a mobile communication terminal and a PDA and includes a data communication function of the PDA, such as scheduling, fax transmission/reception and Internet access, as well as the functions of the mobile communication terminal. In addition, the MM-MB terminal refers to a terminal which may include a multi-modem chip and operate in a portable Internet system and other mobile communication systems (e.g., a Code Division Multiple Access (CDMA) 2000 system, a Wideband CDMA (WCDMA) system, etc.).

The embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. The software code may be stored in the memory units 2280 and 2290 so that it can be driven by the processors 2220 and 2230. The memory units are located inside or outside of the processors, so that it can communicate with the aforementioned processor via a variety of well-known parts.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

INDUSTRIAL APPLICABILITY

The present invention is applicable to various wireless access systems. Examples of the various wireless access systems include a 3rd Generation Partnership Project (3GPP) system, a 3GPP2 system and/or an Institute of Electrical and Electronic Engineers (IEEE) 802.xx system. The embodiments of the present invention are applicable to all technical fields using the various wireless access systems in addition to the various wireless access systems.

The invention claimed is:

1. A method for supporting on or off of a second cell at a first cell neighboring to the second cell in a wireless access system, the method comprising:
  receiving, by a device in the first cell from a device in the second cell, a cell on/off state indicator message indicating on or off of the device in the second cell;
  adjusting, by the device in the first cell, a handover offset of the device in the second cell, taking into account interference within the first cell caused by the on or off of the device in the second cell;
  transmitting, by the device in the first cell, handover offset information about the adjusted handover offset to the device in the second cell and a first User Equipment (UE),
  wherein the first cell is a serving cell of the first UE and the second cell is a serving cell of a second UE,
  if the cell on/off state indicator message indicates an on state of the device in the second cell:
    receiving, by the device in the first cell, a first measurement report message from the first UE, the first measurement report message including first measurement result information measured by the first UE based on the adjusted handover offset; and
    determining, by the device in the first cell, whether to perform handover of the first UE from the first cell to the second cell based on the first measurement result information; and
  if the cell on/off state indicator message indicates an off state of the device in the second cell:
    receiving, by the device in the first cell, a second measurement report message from the second UE, the second measurement report message including second measurement result information measured by the second UE based on the second adjusted handover offset; and
    determining, by the device in the first cell, whether to perform handover of the second UE from the second cell to the first cell based on the second measurement result information.

2. The method according to claim 1, further comprising: when the second cell is off:
  controlling, by the device in the first cell, transmission power of the device in the first cell based on the handover offset information; and
  transmitting, by the device in the first cell, the controlled transmission power value to the second UE.

3. A method for controlling transmission power upon cell on/off in a wireless access system, the method comprising:
  powering on with an initial transmission power by a device in a second cell,
  wherein the initial transmission power is determined by the device in the second cell by taking into account interference with a device in a first cell neighboring to the second cell;
  adjusting, by the device in the second cell, a handover offset to reduce the interference with the device in the first cell;
  transmitting, by the device in the second cell, power information indicating the initial transmission power and handover offset information about the adjusted handover offset to the device in the first cell and a User Equipment (UE);

performing, by the device in the second cell, handover with the UE receiving the handover offset information;

adjusting, by the device in the second cell, a transmitting power from the initial transmission power based on the adjusted handover offset; and transmitting, by the device in the second cell to the UE, a power level indicator message indicating the adjusted transmitting power, wherein, if a coverage of the device in the second cell is expanded based on the adjusted handover offset, the power of the second cell is increased based on the extended coverage, and wherein, if the coverage of the device in the second cell is reduced based on the adjusted handover offset, the power of the device in the second cell is decreased based on the extended coverage.

4. The method according to claim 3, wherein the handover offset information is handover offset information about the second cell.

5. The method according to claim 3, wherein the handover offset information is handover offset information about the first cell.

6. The method according to claim 3, wherein the UE performs neighbor cell measurement to perform handover from the first cell to the second cell based on the handover offset information.

7. An apparatus for supporting on or off of a second cell in a wireless access system, the apparatus comprising:
a transmitter;
a receiver; and
a processor configured to support the on/off of the second cell,
wherein the processor is configured to:
control the receiver to receive from a device in a second cell a cell on/off state indicator message indicating on or off of the device in the second cell,
adjust a handover offset of the device in the second cell, taking into account interference experienced by the processor within a first cell neighboring to the second cell caused by the on or off of the device in the second cell, and
control the transmitter to transmit handover offset information about the adjusted handover offset to the device in the second cell and a first User Equipment (UE), and
wherein the first cell is a serving cell of the first UE and the second cell is a serving cell of a second UE,
wherein, if the cell on/off state indicator message indicates an on state of the device in the second cell, the processor is further configured to:
receive a first measurement report message from the first UE, the first measurement report message including first measurement result information measured by the first UE based on the adjusted handover offset; and
determine whether to perform handover of the first UE from the first cell to the second cell based on the first measurement result information; and
wherein, if the cell on/off state indicator message indicates an off state of the device in the second cell, the processor is configured to:
receive a second measurement report message from the second UE, the second measurement report message including second measurement result information measured by the second UE based on the second adjusted handover offset; and
determine whether to perform handover of the second UE from the second cell to the first cell based on the second measurement result information.

8. The apparatus according to claim 7, wherein, when the second cell is off, the device in the first cell controls transmission power of the device in the first cell based on the handover offset information, and transmits the controlled transmission power value to the second UE.

* * * * *